US012777556B2

(12) United States Patent
Pradas et al.

(10) Patent No.: US 12,777,556 B2
(45) Date of Patent: Oct. 27, 2026

(54) METHODS FOR SUPPORTING MULTIPLE DISCONTINUOUS RECEPTION (DRX) CONFIGURATIONS

(71) Applicant: Telefonaktiebolaget LM Ericsson (publ), Stockholm (SE)

(72) Inventors: Jose Luis Pradas, Stockholm (SE); Du Ho Kang, Sollentuna (SE); Andra Mihaela Voicu, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 230 days.

(21) Appl. No.: 18/688,562

(22) PCT Filed: Sep. 2, 2022

(86) PCT No.: PCT/IB2022/058282
§ 371 (c)(1),
(2) Date: Mar. 1, 2024

(87) PCT Pub. No.: WO2023/031877
PCT Pub. Date: Mar. 9, 2023

(65) Prior Publication Data

US 2024/0357704 A1 Oct. 24, 2024

Related U.S. Application Data

(60) Provisional application No. 63/240,864, filed on Sep. 3, 2021.

(51) Int. Cl.
*H04W 76/28* (2018.01)

(52) U.S. Cl.
CPC .................................. *H04W 76/28* (2018.02)

(58) Field of Classification Search
CPC ................ Y02D 30/70; H04W 76/28; H04W 52/0216; H04W 72/23; H04W 92/18; H04W 24/10; H04W 52/0225; H04W 76/27; H04W 72/20; H04W 24/02; H04W 72/1273; H04W 28/24; H04L 5/0053; H04L 5/0048; H04L 5/001
See application file for complete search history.

(56) References Cited

U.S. PATENT DOCUMENTS 11,523,457 B2 * 12/2022 He ........................ H04W 76/28
2022/0030661 A1 * 1/2022 Jeong .................... H04W 72/20
2022/0225377 A1 * 7/2022 Kim .................. H04W 52/0216
2023/0063472 A1 * 3/2023 Freda ............... H04W 52/0229
(Continued)

OTHER PUBLICATIONS

International Search Report and Written Opinion issued in International Application No. PCT/IB2022/058282 dated Dec. 22, 2022 (11 pages).
(Continued)

*Primary Examiner* — Olumide Ajibade Akonai
(74) *Attorney, Agent, or Firm* — Rothwell, Figg, Ernst & Manbeck, P.C.

(57) ABSTRACT

A method performed by a UE for supporting multiple DRX cycle configurations. The method includes obtaining multiple DRX cycle configurations. The method also includes, for each DRX cycle configuration, identifying a set of one or more flows associated with the DRX cycle configuration.

17 Claims, 14 Drawing Sheets

(56) References Cited

U.S. PATENT DOCUMENTS

| | | | | |
|---|---|---|---|---|
| 2023/0239793 | A1* | 7/2023 | Lin | H04W 52/0216 370/311 |
| 2024/0215107 | A1* | 6/2024 | Fu | H04W 52/0229 |

OTHER PUBLICATIONS

Moderator (vivo), "[104b-e-NR-XR-02] Email discussion for evaluation methodology and assumptions", 3GPP TSG-RAN WG1 Meeting #104b-e, e-Meeting, Apr. 12-20, 2021, R1-2103827 (31 pages).
Vivo, "Summary of AI 8.14.4 for XR", 3GPP TSG-RAN WG1 Meeting #105-3, e-Meeting, May 10-27, 2021, R1-2106038 (9 pages).
ZTE, "[AT113bis-e][708][V2X/SL] DRX configuration for SL groupcast and broadcast", 3GPP TSG-RAN WG2 Meeting #114 electronic Online, May 19-May 27, 2021, R2-2105912 (21 pages).
3GPP TS 38.321 V16.5.0 (Jun. 2021) (157 pages).
3GPP TS 38.331 V16.5.0 (Jun. 2021) (959 pages).
MediaTek Inc., "DRX configuration for NR," 3GPP TSG-RAN WG2 #98, R2-1704944, Hangzhou, China, May 15-19, 2017 (3 pages).
Qualcomm, " [FS_XRTraffic] Summary of XR Traffic Models for RAN1 and Open Issues," SA4-e (AH) Video SWG post 111-e, S4aV200640 (Jan. 12, 2021) (18 pages).

* cited by examiner

FIG. 2B
Video flow
Audio flow
Data flow
UL flows
DL flows
TDD pattern
TSs in
Active Time
Time [ms]

METHODS FOR SUPPORTING MULTIPLE DISCONTINUOUS RECEPTION (DRX) CONFIGURATIONS

CROSS REFERENCE TO RELATED APPLICATIONS

This application is a 35 U.S.C. § 371 National Stage of International Patent Application No. PCT/IB2022/058282, filed 2022 Sep. 2, which claims priority to Provisional Application No. 63/240,864, filed on 2021 Sep. 3, which is incorporated by this reference.

TECHNICAL FIELD

This disclosure relates to concepts of discontinuous reception (DRX) and services whose traffic comprises multiple traffic flows (e.g., extended reality (XR) applications, such as, for example, virtual reality (VR) application, augmented reality (AR) applications, etc.).

BACKGROUND

DRX

DRX is a mechanism that enables a user equipment (UE) to save energy by not monitoring the downlink (DL) during certain periods of time (e.g., when data traffic is not expected at the UE). The DRX framework consists of two different types of DRX cycles with different periods: a long DRX cycle and an optional short DRX cycle. In principle, the short DRX cycle results in the UE monitoring the DL more often than when the UE operates according to the long DRX cycle. Entering the long or short DRX cycles occurs as follows: if the short DRX cycle is not configured, then the UE enters the long DRX cycle after an inactivity timer expires (i.e., when there are no DL or UL transmissions for a period of time); if the optional short DRX cycle is configured, then the UE enters this cycle after the DRX inactivity timer expires; and if the short DRX cycle is configured and the short cycle timer expires, the UE enters the long DRX cycle.

As described in reference [1], DRX is controlled by the parameters indicated in Table 1 below:

TABLE 1

| |
|---|
| drx-onDurationTimer: the duration at the beginning of a DRX cycle; |
| drx-SlotOffset: the delay before starting the drx-onDurationTimer; |
| drx-InactivityTimer: the duration after the PDCCH occasion in which a PDCCH indicates a new UL or DL transmission for the MAC entity; |
| drx-RetransmissionTimerDL (per DL HARQ process except for the broadcast process): the maximum duration until a DL retransmission is received; |
| drx-RetransmissionTimerUL (per UL HARQ process): the maximum duration until a for UL retransmission is received; |
| drx-LongCycleStartOffset: the Long DRX cycle and drx-StartOffset which defines the subframe where the Long and Short DRX cycle starts; |
| drx-ShortCycle (optional): the Short DRX cycle; |
| drx-ShortCycleTimer (optional): the duration the UE shall follow the Short DRX cycle; |
| drx-HARQ-RTT-TimerDL (per DL HARQ process except for the broadcast process): the minimum duration before a DL assignment for HARQ retransmission is expected by the MAC entity; |
| drx-HARQ-RTT-TimerUL (per UL HARQ process): the minimum duration before a UL HARQ retransmission grant is expected by the MAC entity; |
| ps-Wakeup (optional): the configuration to start associated drx-onDurationTimer in case DCP is monitored but not detected; |
| ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started; |
| ps-TransmitPeriodicLI-RSRP (optional): the configuration to transmit periodic CSI that is L1-RSRP on PUCCH during the time duration indicated by drx-onDurationTimer in case DCP is configured but associated drx-onDurationTimer is not started. |

As described in reference [2] The DRX configuration may take the following values as shown in Table 2 below.

TABLE 2

DRX-Config information element

```
ASN1START
TAG-DRX-CONFIG-START
DRX-Config ::=                          SEQUENCE {
drx-onDurationTimer                     CHOICE {
subMilliSeconds                     INTEGER (1..31),
milliSeconds                        ENUMERATED {
ms1, ms2, ms3, ms4, ms5, ms6, ms8, ms10, ms20, ms30, ms40, ms50, ms60,
ms80, ms100, ms200, ms300, ms400, ms500, ms600, ms800, ms1000, ms1200,
ms1600, spare8, spare7, spare6, spare5, spare4, spare3, spare2, spare1 }
},
drx-InactivityTimer                     ENUMERATED {
ms0, ms1, ms2, ms3, ms4, ms5, ms6, ms8, ms10, ms20, ms30, ms40, ms50, ms60, ms80,
ms100, ms200, ms300, ms500, ms750, ms1280, ms1920, ms2560, spare9, spare8,
spare7, spare6, spare5, spare4, spare3, spare2, spare1},
drx-HARQ-RTT-TimerDL                        INTEGER (0..56),
drx-HARQ-RTT-TimerUL                        INTEGER (0..56),
```

TABLE 2-continued

DRX-Config information element

```
drx-RetransmissionTimerDL                    ENUMERATED {
sl0, sl1, sl2, sl4, sl6, sl8, sl16, sl24, sl33, sl40, sl64, sl80, sl96, sl112, sl128,
sl160, sl320, spare15, spare14, spare13, spare12, spare11, spare10, spare9,
spare8, spare7, spare6, spare5, spare4, spare3, spare2, spare1},
drx-RetransmissionTimerUL                    ENUMERATED {
sl0, sl1, sl2, sl4, sl6, sl8, sl16, sl24, sl33, sl40, sl64, sl80, sl96, sl112, sl128,
sl160, sl320, spare15, spare14, spare13, spare12, spare11, spare10, spare9,
spare8, spare7, spare6, spare5, spare4, spare3, spare2, spare1 },
drx-LongCycleStartOffset                     CHOICE {
ms10                                 INTEGER(0..9),
ms20                                 INTEGER(0..19),
ms32                                 INTEGER(0..31),
ms40                                 INTEGER(0..39),
ms60                                 INTEGER(0..59),
ms64                                 INTEGER(0..63),
ms70                                 INTEGER(0..69),
ms80                                 INTEGER(0..79),
ms128                                INTEGER(0..127),
ms160                                INTEGER(0..159),
ms256                                INTEGER(0..255),
ms320                                INTEGER(0..319),
ms512                                INTEGER(0..511),
ms640                                INTEGER(0..639),
ms1024                               INTEGER(0..1023),
ms1280                               INTEGER(0..1279),
ms2048                               INTEGER(0..2047),
ms2560                               INTEGER(0..2559),
ms5120                               INTEGER(0..5119),
ms10240                              INTEGER(0..10239)
},
shortDRX                             SEQUENCE {
drx-ShortCycle                       ENUMERATED {
ms2, ms3, ms4, ms5, ms6, ms7, ms8, ms10, ms14, ms16, ms20, ms30, ms32,
ms35, ms40, ms64, ms80, ms128, ms160, ms256, ms320, ms512, ms640, spare9,
spare8, spare7, spare6, spare5, spare4, spare3, spare2, spare1 },
drx-ShortCycleTimer                  INTEGER (1..16)
} OPTIONAL,                        -- Need R
drx-SlotOffset                     INTEGER (0..31)
}
TAG-DRX-CONFIG-STOP
-- ASN1STOP
```

A UE can be configured with up to two DRX parameter sets, each corresponding to a DRX group. A Serving Cell can be assigned to only one DRX group (see reference [1]). This means that the UE monitors the DL of a given Serving Cell according to only one long DRX cycle configuration and, optionally, one short DRX cycle configuration. In the current standard specifications up to Rel-17, the DRX is activated when configured by the network. If the UE uses the long DRX cycle, it monitors the DL by starting the drx-onDurationTimer, if the following condition is fulfilled: [(SFN×10)+subframe number] modulo (drx-LongCycle)=drx-StartOffset, where SFN is the system frame number. If the UE uses the short DRX cycle, it monitors the DL by starting the drx-onDurationTimer, if the following condition is fulfilled: [(SFN×10)+subframe number]modulo (drx-ShortCycle)=(drx-StartOffset) modulo (drxShortCycle).

The UE DL monitoring operation according to the long and the short DRX cycles is illustrated in FIG. 1. That is, FIG. 1 provides an illustration of basic UE DL monitoring when the long and short DRX cycles are configured. The time during which the drx-onDurationTimer or drx-InactivityTimer is running is part of the Active Time when the UE monitors the DL.

XR Application Traffic

XR applications typically generate multiple traffic flows and this is modelled accordingly in 3GPP (see e.g., reference [3]). For instance, an XR application may produce a video traffic flow, an audio traffic flow, and data (control) traffic flow. All these flows are assumed to be periodic, but the inter-frame time (i.e. the periodicity) and data rate for each of the flows is different from the other flows. As an example, for DL XR conversational traffic, the inter-frame time of the video, audio, and data flows is 16.67 ms (i.e. 1/60 fps), 20-21.3 ms, and 10 ms, respectively (see reference [3]). Another characteristic of XR traffic is that the packet sizes are typically varying, especially for video flows.

SUMMARY

There currently exist certain challenges. For instance, for the traffic generated by XR applications ("XR traffic"), a bounded latency must be ensured. For this, the UE should ideally be monitoring the DL, i.e. be in the Active Time of the DRX, whenever there is XR traffic generated in the DL. Thus, if radio resources are available, this XR traffic can be immediately transmitted to the UE. If the UE is not in the Active Time when XR traffic is generated in the DL, this XR traffic must be delayed until the UE is awake, which can lead to a longer latency than that tolerated by XR applications.

At the same time, the Active Time as determined by the drx-onDurationTimer and the drx-InactivityTimer should not be very long because the UE monitors the DL for a long period of time, which results in a high energy consumption. With the current standard DRX solution it is especially difficult to configure a short Active Time when XR traffic with multiple flows is generated. This is due to the different and short periodicities of the traffic flows, which result in two effects. First, there is frequent traffic arriving in the DL, so the UE cannot stop monitoring the DL and go to sleep for a long time. Second, the flows have different relative shifts with respect to each other at different moments in time, due to their different periodicities. Consequently, the periodicity of a single long DRX cycle cannot be configured to follow closely this multi-flow traffic, so a long ActiveTime has to be used instead, in order to span the arrival time of traffic from multiple flows.

This is illustrated in FIG. 2A for three traffic flows in the DL (video, audio, and data), each of which has a corresponding UL flow. A TDD pattern with three UL time sots (TSs) followed by one DL TS is assumed, where a TS is 0.5 ms long. For the DL video flow, 3 ms (i.e., 6 TSs) are required to transmit a frame. For all other DL and UL flows, a single TS per packet is sufficient. The periodicities of the video, audio, and data flows are 16.67 ms, 20 ms, and 10 ms, respectively. A single long DRX cycle is configured, where drx-onDurationTimer=2 ms, drx-InactivityTimer=6 ms, and the DRX periodicity is 10 ms, namely the minimum specified in the current 3GPP standard. These values were selected such that the UE is always awake when traffic is generated in the DL, in order to minimize the latency. In this example the short DRX cycle is not configured, since this is an optional standard feature.

We observe in FIG. 2A that with DRX the UE is in Active Time for a very large number of TSs, namely 90% of the time. This causes a high energy consumption due to DL monitoring at the UE. By contrast, in the corresponding ideal case shown in FIG. 2B, the UE is in Active Time for only 34% of the time. Thus, there is a large difference between the current standard DRX solution and the ideal case, in terms of energy consumption. Consequently, better DRX solutions are needed, in order to save more energy when multi-flow XR applications are supported.

Certain aspects of the disclosure and their embodiments provide solutions to these or other challenges. For example, it is proposed herein to support multiple DRX cycle configurations per Serving Cell, where one or more of the configurations are active simultaneously. Each DRX cycle can be mapped to a traffic flow, such that the DRX periodicity matches the periodicity of the associated traffic flow and the Active Time matches the packet transmission duration of the respective traffic flow. Thus, the overall combined Active Time of the DRX cycles can follow closely the traffic pattern to maintain a low latency and at the same time the Active Time can be shortened to save energy at the UE. Put another way, it is proposed herein that a single device can be configured to support multiple simultaneous DRX cycle configurations in order to handle a service with multiple traffic flows, such as, for example, an XR application. This may include DRX configurations differentiated by a flow or traffic type specific information and UE behavior to harmonize multiple DRX configuration parameters for efficient energy saving with low latency.

Accordingly, in one aspect there is provided a method performed by a UE for supporting multiple DRX configurations. The method includes obtaining multiple DRX cycle configurations. The method also includes, for each DRX cycle configuration, identifying a set of one or more flows associated with the DRX cycle configuration. In another aspect there is provided a UE that includes processing circuitry and a power source providing power to the processing circuitry, wherein the UE is configured to perform the method. In another aspect there is provided a computer program comprising instructions which when executed by the processing circuitry causes the UE to perform the method.

In another aspect there is provided a method performed by a network node for supporting multiple DRX cycle configurations. The method includes the network node providing to a UE multiple DRX cycle configurations. In another aspect there is provided a network node that includes processing circuitry and a power source providing power to the processing circuitry, wherein the network node is configured to perform the method. In another aspect there is provided a computer program comprising instructions which when executed by the processing circuitry causes the network node to perform the method.

Certain embodiments may provide one or more of the following technical advantage(s) such as providing a straightforward implementation that may achieve high power saving gains at the UE compared to the standard long DRX cycle without reducing latency when multiple flows are present. For example, FIG. 3 shows the same three traffic flows as FIG. 2A, for the proposed multiple DRX solution. There are thus three DRX cycle configurations, matching the three traffic flows. The Active Time for the proposed solution is only 44%, resulting in a significant power saving gain of 51% compared to the standard DRX solution. We note that the power saving gain is defined as $(\text{ActiveTime}_{StandardDRX}-\text{ActiveTime}_{ProposedDRX})/\text{ActiveTime}_{StandardDRX}\times 100\%$. FIG. 4 shows further power saving gains of the proposed solution, for different numbers of TSs occupied by the transmission of one video frame in the video flow. The power saving gain is consistently significant and ranges from 51% to 70%.

BRIEF DESCRIPTION OF THE DRAWINGS

The accompanying drawings, which are incorporated herein and form part of the specification, illustrate various embodiments.

DETAILED DESCRIPTION

Some of the embodiments contemplated herein will now be described more fully with reference to the accompanying drawings. Embodiments are provided by way of example to convey the scope of the subject matter to those skilled in the art.

It is proposed herein to introduce support for multiple DRX cycle configurations which may operate simultaneously at the UE. The DRX configurations can be numbered from 1 to n, (n can be predetermined). A network node (e.g., a 5G base station (gNB)) selects multiple DRX cycle configurations for a UE and sends the selected DRX cycle configurations to the UE. The UE stores these configurations and combines them for DRX operation. Each DRX configuration may be coupled to one or more specific flows (e.g., traffic flows, logical channels, data radio bearers (DRBs), quality-of-service (QoS) flows). It is also possible that a legacy DRX without coupling to any specific flow is configured to capture joint parameters for multiple traffic flows. If a UE receives a legacy DRX configuration together with a DRX configuration for a specific flow (e.g., with flow indication), a UE may prioritize DRX parameters from legacy DRX over the other when multiple timers are running. These steps are described in detail as follows.

Figure 1:
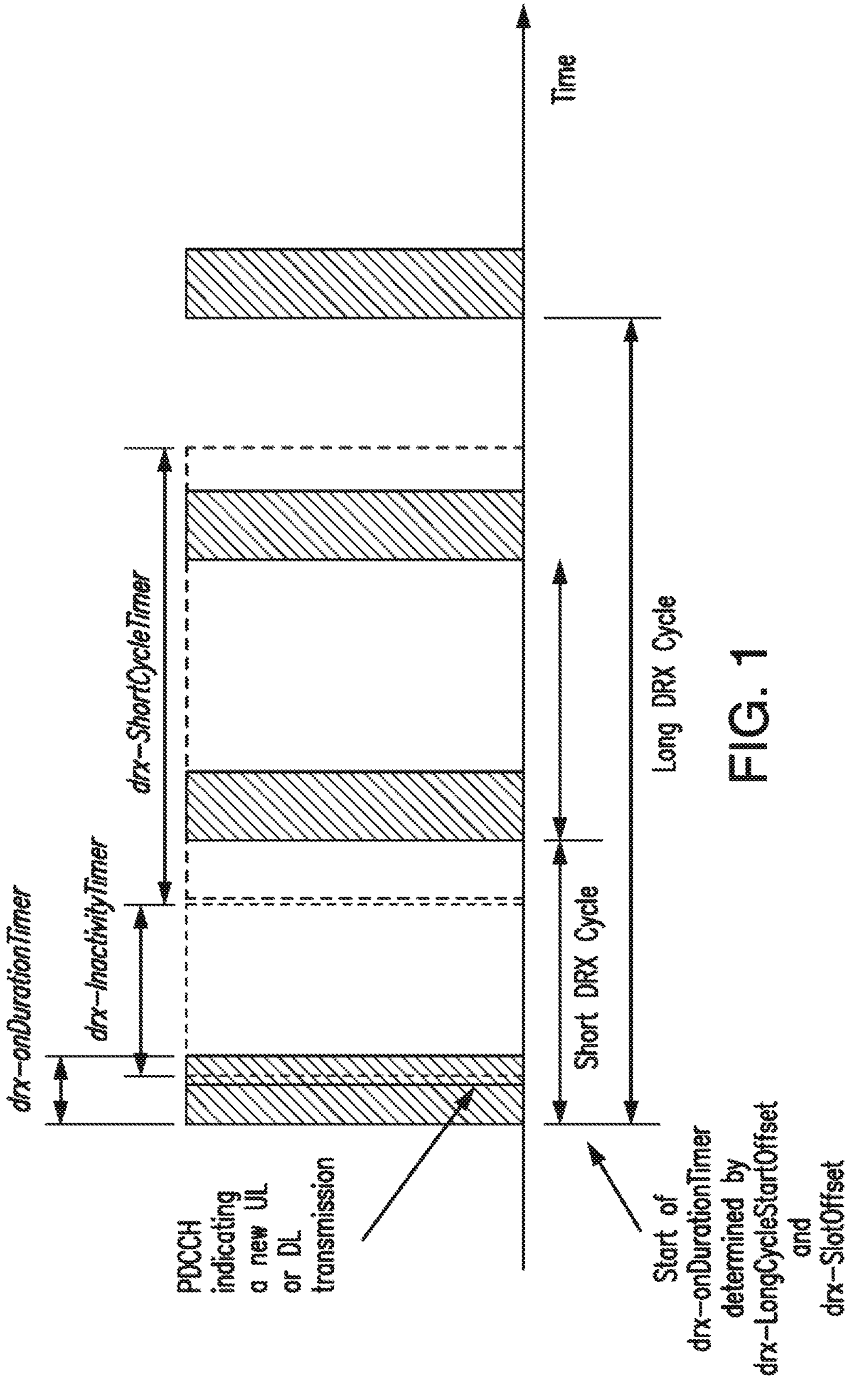
FIG. 1 illustrates basic UE DL monitoring when the long and short DRX cycles are configured.
Figure 2A:
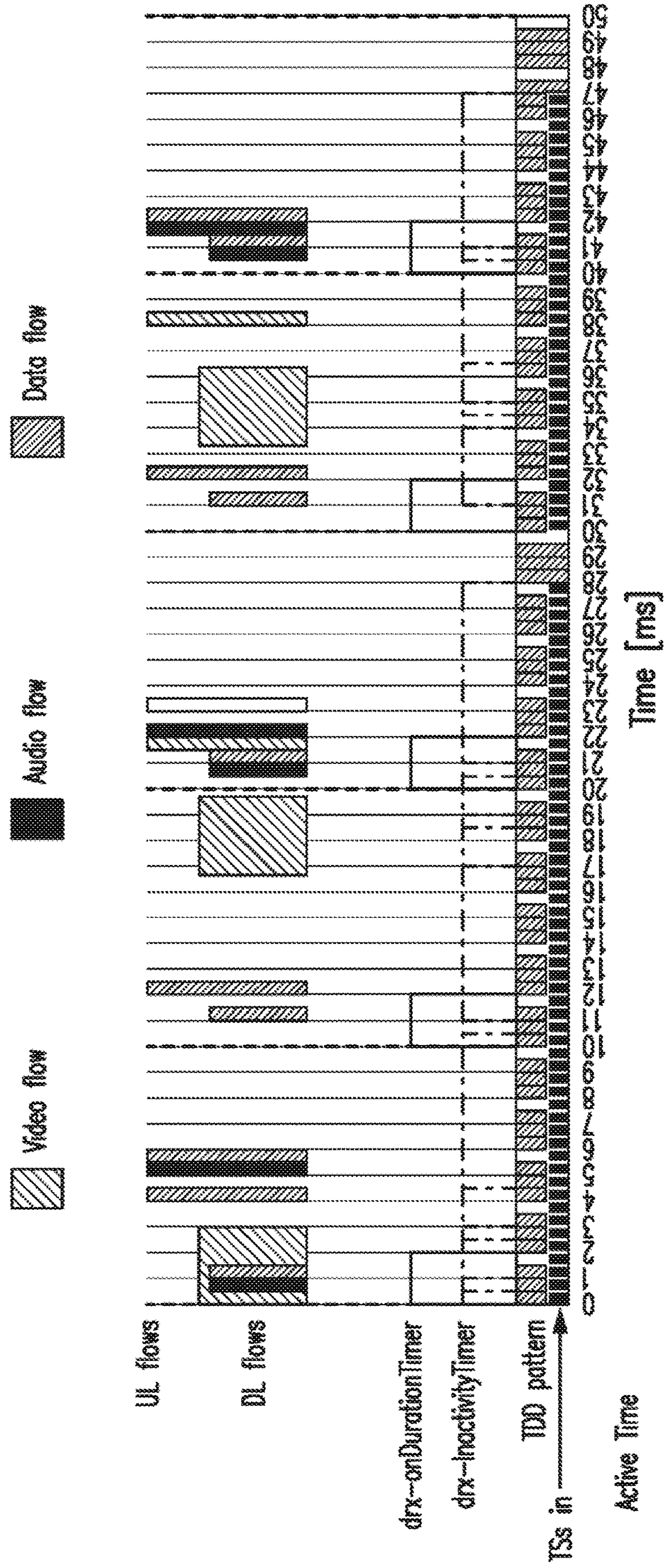
FIG. 2A illustrates a long DRX cycle.
Figure 2B:
FIG. 2B illustrates an ideal case.
Figure 3:
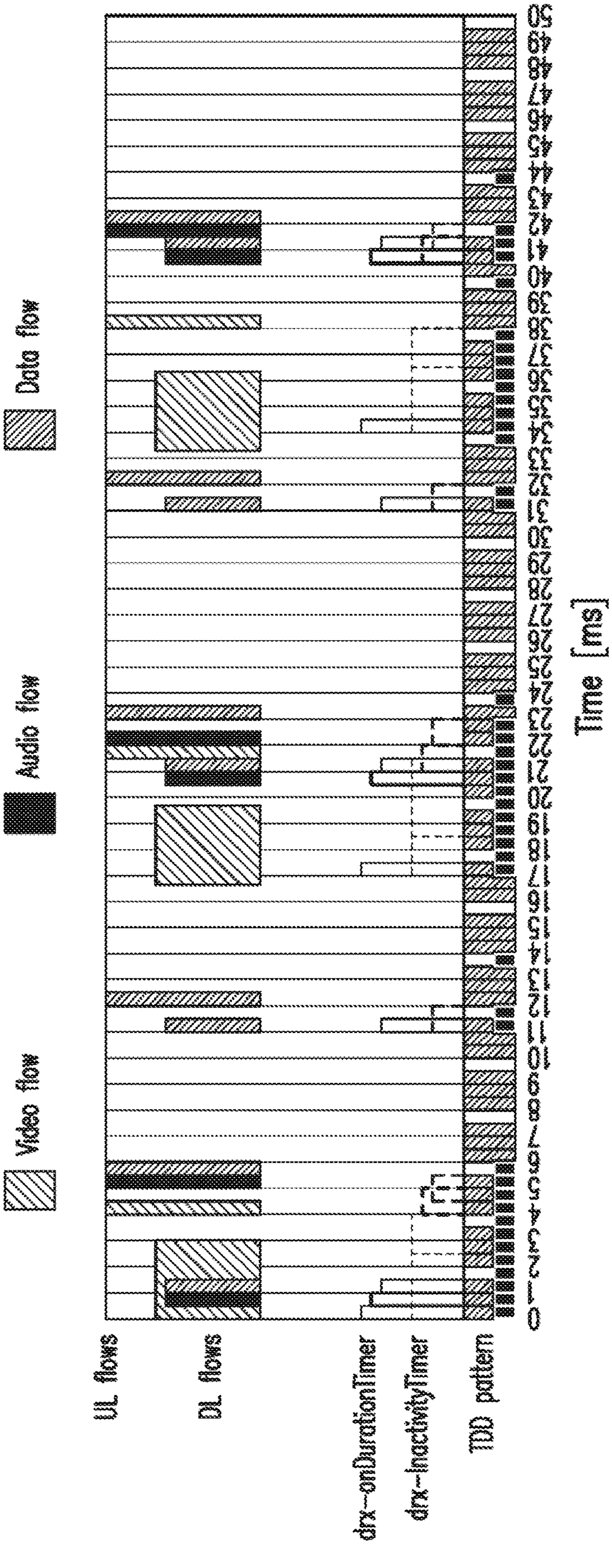
FIG. 3 illustrates TSs in Active Time, for XR traffic with three flows and three long DRX cycle configurations matching the periodicities of the flows
Figure 4:
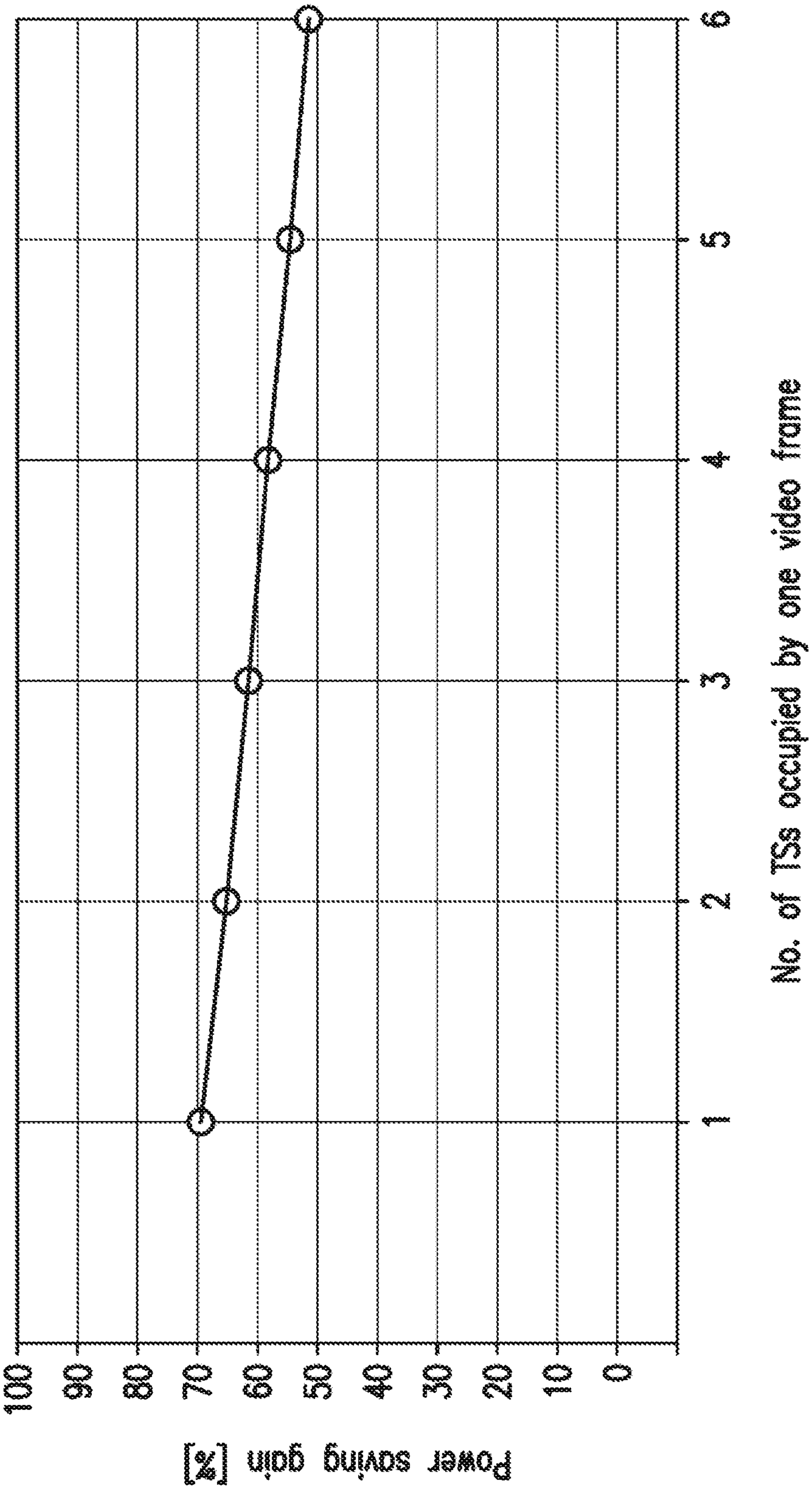
FIG. 4 illustrates power saving gains.
Figure 5:
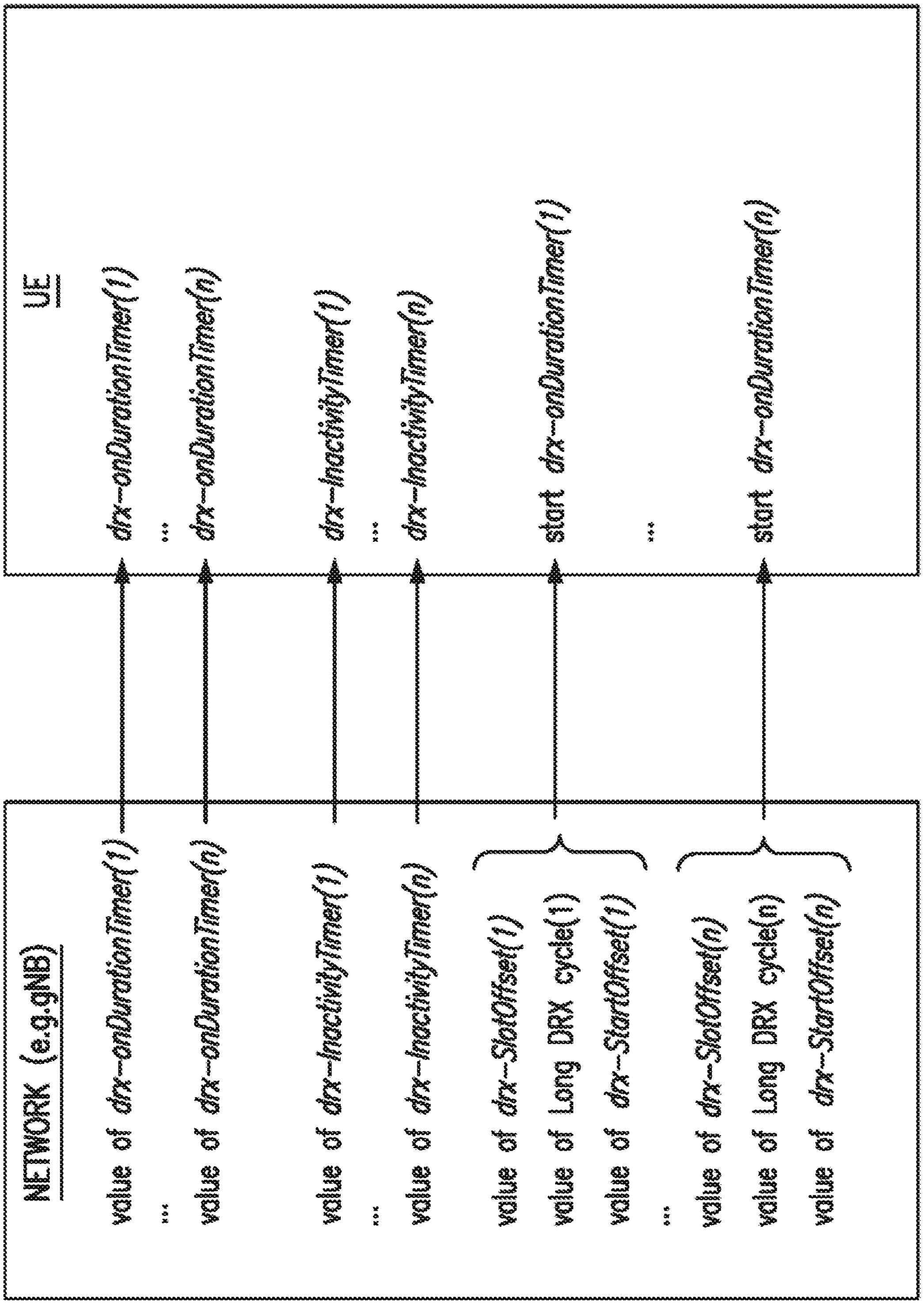
FIG. 5 illustrates DRX parameters.

For each DRX configuration x, the network configures one or more of the following parameters: drx-SlotOffset(x), Long DRX cycle(x), drx-StartOffset(x), drx-onDurationTimer(x), and drx-InactivityTimer(x). This is shown in FIG. 5. The DRX parameter values can be equal or different for different configurations. This can be used, for instance, for multiple periodic traffic flows. The drx-SlotOffset, Long DRX cycle, and drx-StartOffset can be selected to correspond to the flow periodicity, while drx-onDurationTimer and drx-InactivityTimer can be selected to consider the packet transmission duration, scheduling time, and jitter of the associated flow as well as other factors such as retransmissions and decoding errors.

In some embodiments, the network may configure one general drx-InactivityTimer to be applied to any configuration which is not explicitly configured with a specific value. In other words, providing a drx-InactivityTimer value could be optional for each configuration. When the value is not provided, the drx-InactivityTimer for the given DRX configuration takes a default value which could be a predetermined value, a value configured by the network by default, or it could indicate that there is no inactivity timer configured for the given DRX configuration.

In some embodiments, the network could provide a default DRX configuration with all relevant parameters and the DRX configurations not having explicit values for the different DRX configuration parameters would inherit the values from the default configuration. In some embodiments, the network may configure and provide one drx-InactivityTimer value applicable to all DRX configurations.

The UE implements one or more drx-onDurationTimers and one or more drx-InactivityTimers that can run in parallel, corresponding to the different DRX configurations, as shown in FIG. 5.

Figure 6:
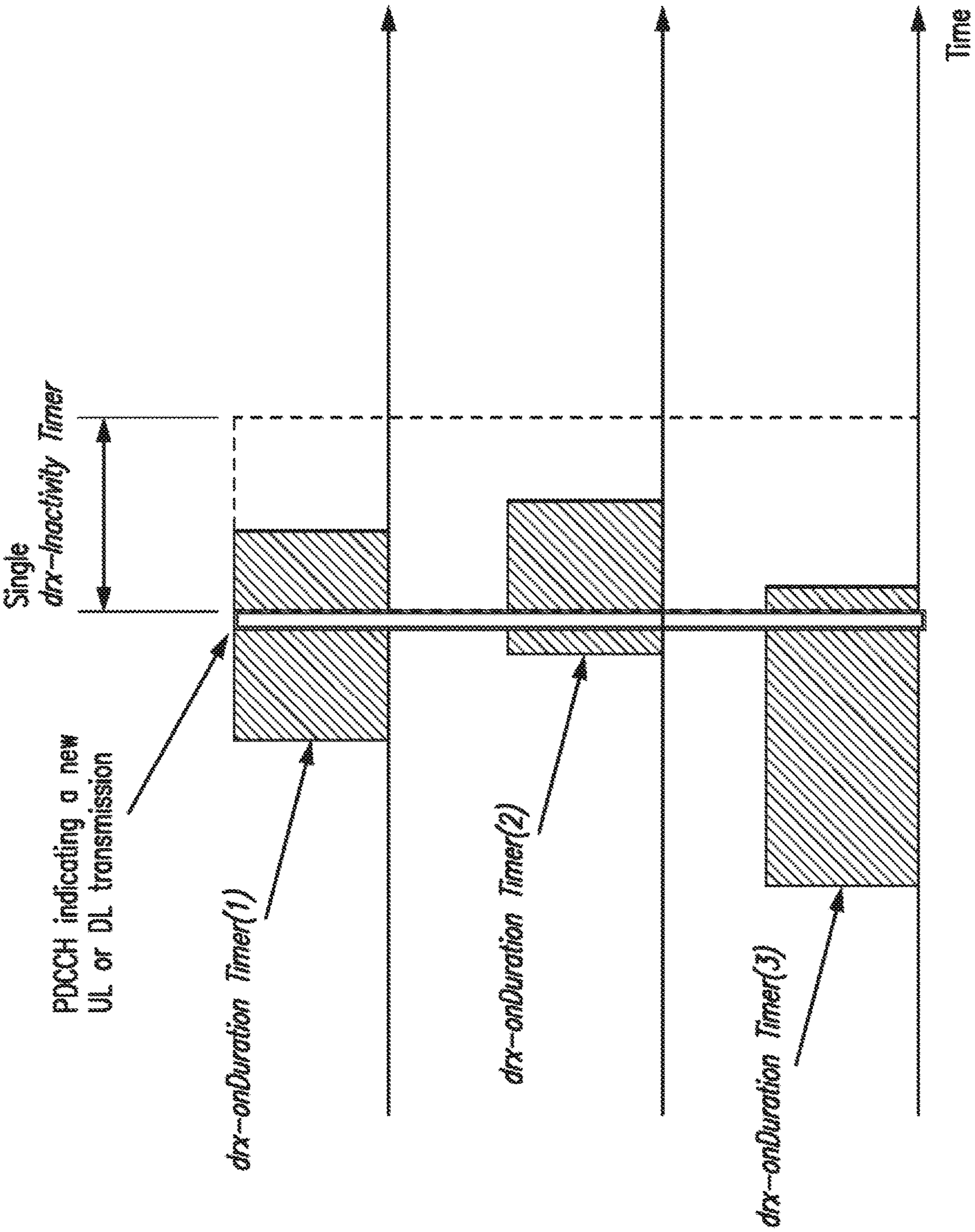
FIG. 6 illustrates three DRX configurations.

FIG. 6 illustrates an example of three DRX configurations at the UE, with three different overlapping drx-onDurationTimers and a single drx-InactivityTimer. The reception at the UE of a PDCCH for scheduling data from any traffic flow triggers the drx-InactivityTimer.

UE Operation Procedures

Figure 8:
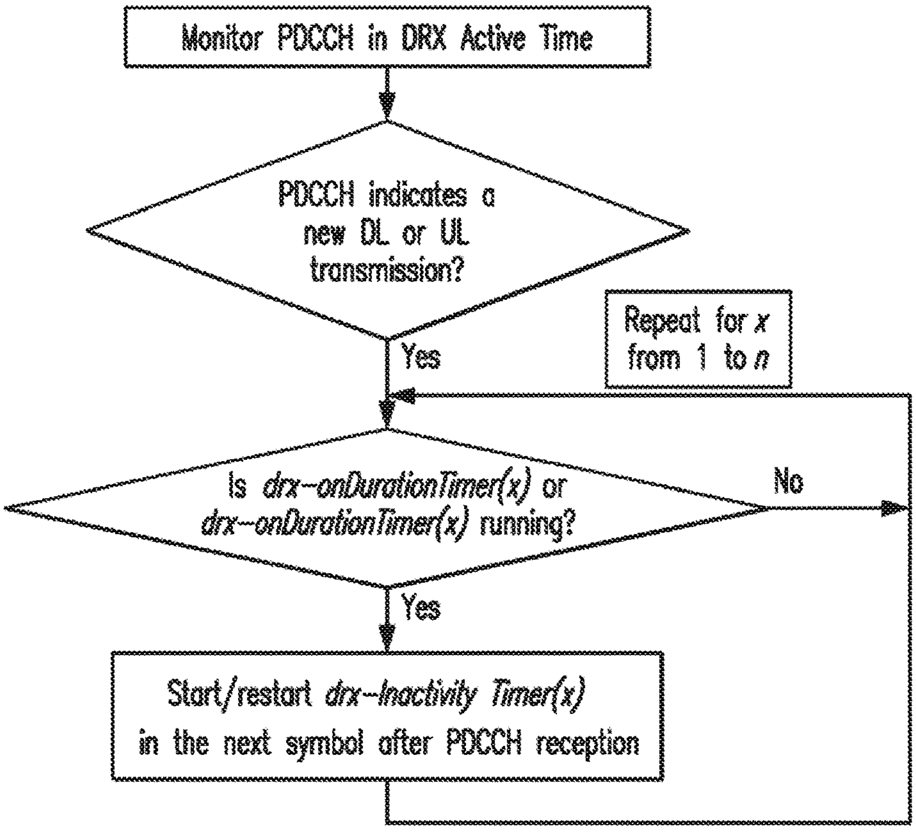
FIG. 8 is a flowchart illustrating a process according to some embodiments.

It is proposed herein for the UE to combine the multiple DRX configurations for starting these timers especially when there is instantaneously any overlap either in multiple drx-onDurationTimers or multiple drx-InactivityTimers. FIG. 8 illustrates an example case of three DRX configurations with three overlapping drx-onDurationTimers and a single drx-InactivityTimer, for which one value must be selected. For case (3), the UE would implement only one drx-InactivityTimer.

Figure 7:
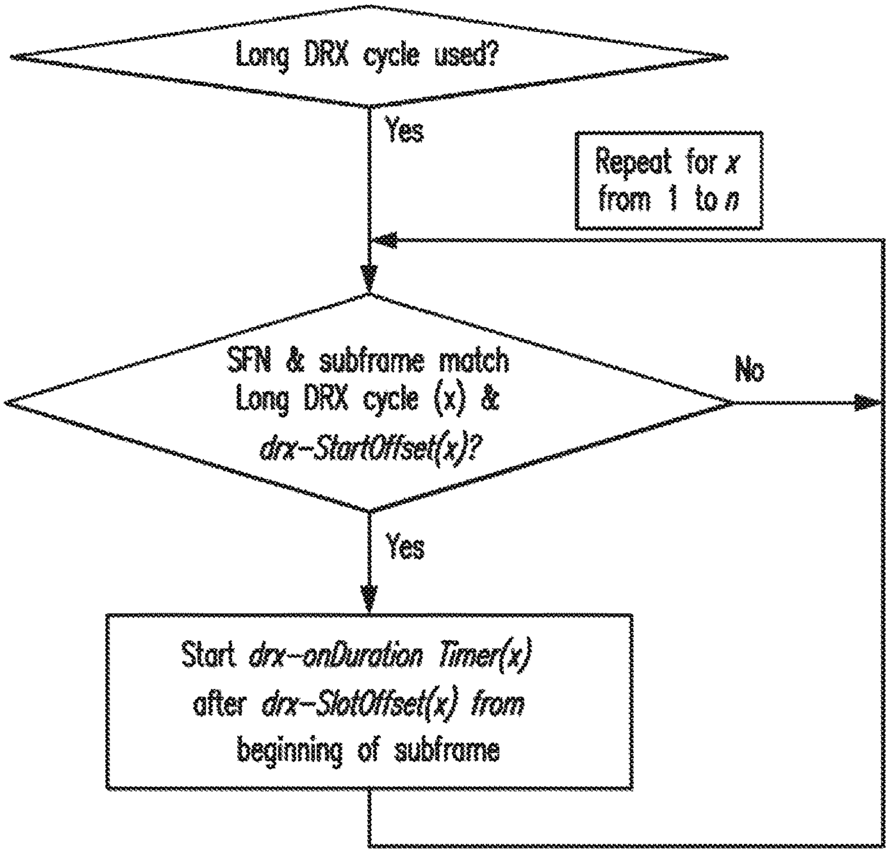
FIG. 7 is a flowchart illustrating a process according to some embodiments.

FIG. 7 shows the proposed modifications for the UE to determine when to start the drx-onDurationTimers, given that the DRX configuration has been activated. The UE should check whether the current SFN and current subframe match DRX configuration x, in order to start drx-onDurationTimer(x), for any x. For this, the following condition in the 3GPP standard should be verified for all DRX configurations [(SFN×10)+SUBFN] modulo (drx-LongCycle(x)) =drx-StartOffset(x), where SUBFN is the subframe number of the current subframe.

If this condition is met for a given DRX configuration x, the UE should simply start the drx-onDurationTimer(x) for the value in configuration x, if the UE implements multiple drx-onDurationTimers. If the UE implements only a single drx-onDurationTimer, the UE should initiate (i.e., start or restart) this timer for the value in configuration x. Additionally, if the single drx-onDurationTimer is already running and the value in configuration x is shorter than the remaining running time, the UE must not restart this timer.

FIG. 8 shows the proposed modifications for the UE to determine when to initiate (start/restart) the drx-InactivityTimers. When a new DL or UL transmission is indicated by the PDCCH, the UE should first check which drx-onDurationTimers and drx-InactivityTimers are running. If for a given configuration x, either drx-onDurationTimer(x) or drx-InactivityTimer(x) is running, the UE should initiate drx-InactivityTimer(x) for the duration given in DRX configuration x.

When one drx-InactivityTimer is implemented in the UE or only one drx-InactivityTimer can run at a time, the procedure changes. In this case, when a new DL or UL transmission is indicated by the PDCCH, the UE should first check which drx-onDurationTimers are running. The UE will select the DRX configurations for which drx-onDurationTimers are running. From this set of DRX configurations, one drx-InactivityTimer value is selected. The selected value may be the longest value, shortest value, or a weighted average of all the values. If multiple drx-onDurationTimers are running and a legacy DRX configuration without flow indication is also signaled, the UE can also prioritize or down-prioritize to select the value from the legacy DRX configuration. Once selected, the UE starts (or restarts) the drx-InactivityTimer with the selected value.

If no drx-onDurationTimers are running and one drx-InactivityTimer was running, the UE restarts the drx-InactivityTimer with the last selected value.

In another case when multiple DRX configurations are sent, a network can also add new information in each new DRX configuration in order to indicate the priority of parameter selections when multiple timers are running and a UE select one DRX parameter set from the priority indication if one drx-onDurationTimer or one drx-InactivityTimer is implemented.

Alongside these modifications in the UE operation procedures, the signaling messages should be modified to support multiple DRX configurations. Such modifications can be made, for instance, in the DRX-Config information element, which is sent from the network to the UE, at the RRC layer.

Figure 9:
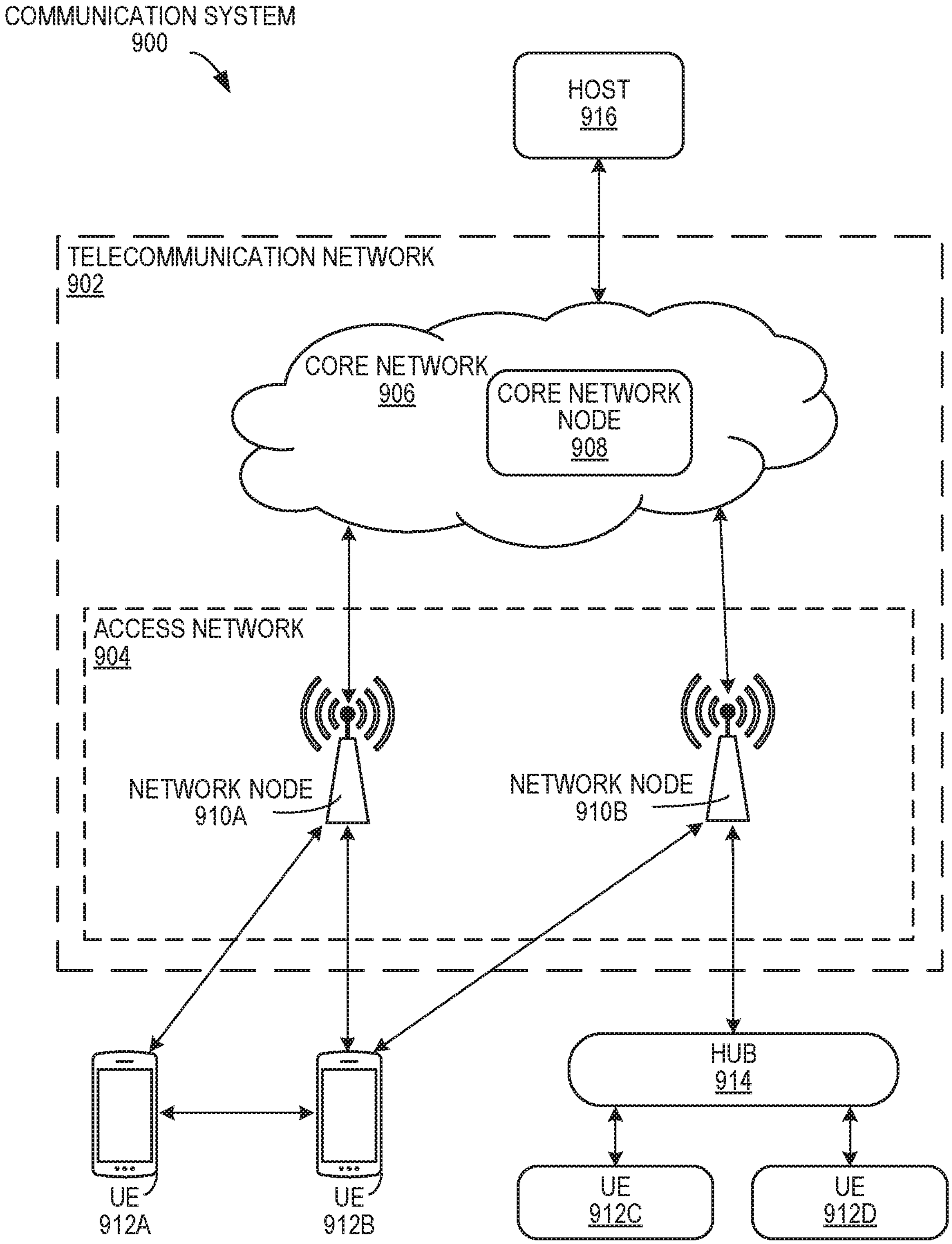
FIG. 9 illustrates a communication system according to some embodiments.

FIG. 9 shows an example of a communication system 900 in accordance with some embodiments.

In the example, the communication system 900 includes a telecommunication network 902 that includes an access network 904, such as a radio access network (RAN), and a core network 906, which includes one or more core network nodes 908. The access network 904 includes one or more access network nodes, such as network nodes 910A and 910B (one or more of which may be generally referred to as network nodes 910), or any other similar 3$^{rd}$ Generation Partnership Project (3GPP) access node or non-3GPP access point. The network nodes 910 facilitate direct or indirect connection of user equipment (UE), such as by connecting UEs 912A, 912B, 912C, and 912D (one or more of which may be generally referred to as UEs 912) to the core network 906 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 900 may include any number of wired or wireless networks, network nodes, UEs, and/or any other components or systems that may facilitate or participate in the communication of data and/or signals whether via wired or wireless connections. The communication system 900 may include and/or interface with any type of communication, telecommunication, data, cellular, radio network, and/or other similar type of system.

The UEs 912 may be any of a wide variety of communication devices, including wireless devices arranged, configured, and/or operable to communicate wirelessly with the network nodes 910 and other communication devices. Similarly, the network nodes 910 are arranged, capable, configured, and/or operable to communicate directly or indirectly with the UEs 912 and/or with other network nodes or equipment in the telecommunication network 902 to enable and/or provide network access, such as wireless network access, and/or to perform other functions, such as administration in the telecommunication network 902.

In the depicted example, the core network 906 connects the network nodes 910 to one or more hosts, such as host 916. These connections may be direct or indirect via one or more intermediary networks or devices. In other examples, network nodes may be directly coupled to hosts. The core network 906 includes one more core network nodes (e.g., core network node 908) that are structured with hardware and software components. Features of these components may be substantially similar to those described with respect to the UEs, network nodes, and/or hosts, such that the descriptions thereof are generally applicable to the corresponding components of the core network node 908. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 916 may be under the ownership or control of a service provider other than an operator or provider of the access network 904 and/or the telecommunication network 902, and may be operated by the service provider or on behalf of the service provider. The host 916 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 900 of FIG. 9 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 902 is a cellular network that implements 3GPP standardized features. Accordingly, the telecommunications network 902 may support network slicing to provide different logical networks to different devices that are connected to the telecommunication network 902. For example, the telecommunications network 902 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 912 are configured to transmit and/or receive information without direct human interaction. For instance, a UE may be designed to transmit information to the access network 904 on a predetermined schedule, when triggered by an internal or external event, or in response to requests from the access network 904. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 914 communicates with the access network 904 to facilitate indirect communication between one or more UEs (e.g., UE 912C and/or 912D) and network nodes (e.g., network node 910B). In some examples, the hub 914 may be a controller, router, content source and analytics, or any of the other communication devices described herein regarding UEs. For example, the hub 914 may be a broadband router enabling access to the core network 906 for the UEs. As another example, the hub 914 may be a controller that sends commands or instructions to one or more actuators in the UEs. Commands or instructions may be received from the UEs, network nodes 910, or by executable code, script, process, or other instructions in the hub 914. As another example, the hub 914 may be a data collector that acts as temporary storage for UE data and, in some embodiments, may perform analysis or other processing of the data. As another example, the hub 914 may be a content source. For example, for a UE that is a VR headset, display, loudspeaker or other media delivery device, the hub 914 may retrieve VR assets, video, audio, or other media or data related to sensory information via a network node, which the hub 914 then provides to the UE either directly, after performing local processing, and/or after adding additional local content. In still another example, the hub 914 acts as a proxy server or orchestrator for the UEs, in particular in if one or more of the UEs are low energy IoT devices.

The hub 914 may have a constant/persistent or intermittent connection to the network node 910B. The hub 914 may also allow for a different communication scheme and/or schedule between the hub 914 and UEs (e.g., UE 912C and/or 912D), and between the hub 914 and the core network 906. In other examples, the hub 914 is connected to the core network 906 and/or one or more UEs via a wired connection. Moreover, the hub 914 may be configured to connect to an M2M service provider over the access network 904 and/or to another UE over a direct connection. In some scenarios, UEs may establish a wireless connection with the network nodes 910 while still connected via the hub 914 via a wired or wireless connection. In some embodiments, the hub 914 may be a dedicated hub—that is, a hub whose primary function is to route communications to/from the UEs from/to the network node 910B. In other embodiments, the hub 914 may be a non-dedicated hub—that is, a device which is capable of operating to route communications between the UEs and network node 910B, but which is additionally capable of operating as a communication start and/or end point for certain data channels.

Figure 10:
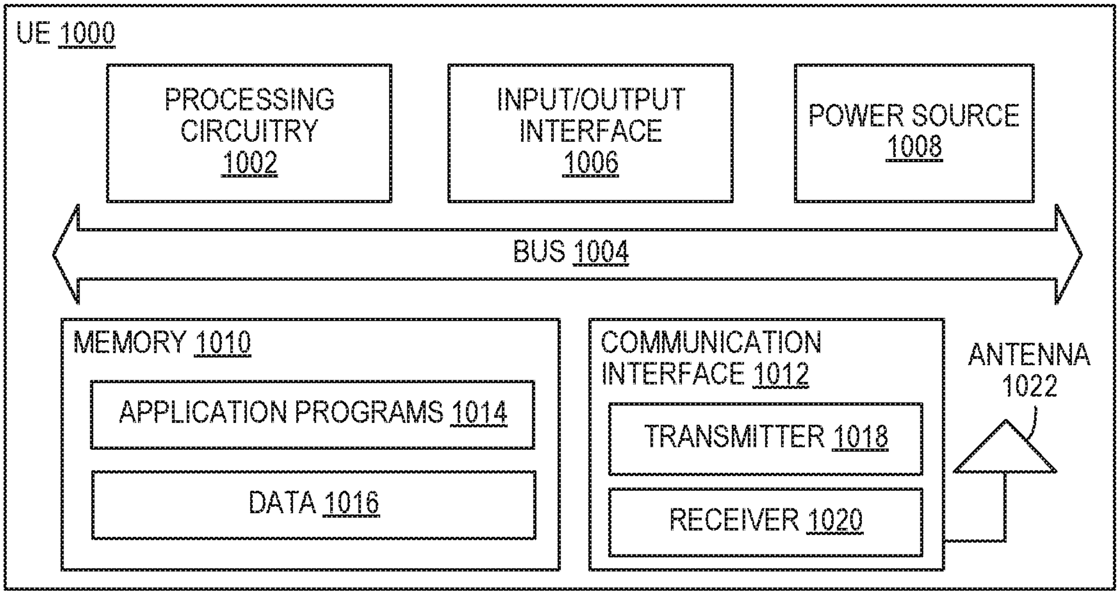
FIG. 10 illustrates a UE according to some embodiments.

FIG. 10 shows a UE 1000 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1000 includes processing circuitry 1002 that is operatively coupled via a bus 1004 to an input/output interface 1006, a power source 1008, a memory 1010, a communication interface 1012, and/or any other component, or any combination thereof. Certain UEs may utilize all or a subset of the components shown in FIG. 10. The level of integration between the components may vary from one UE to another UE. Further, certain UEs may contain multiple instances of a component, such as multiple processors, memories, transceivers, transmitters, receivers, etc.

The processing circuitry 1002 is configured to process instructions and data and may be configured to implement any sequential state machine operative to execute instructions stored as machine-readable computer programs in the memory 1010. The processing circuitry 1002 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1002 may include multiple central processing units (CPUs).

In the example, the input/output interface 1006 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1000. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1008 is structured as a battery or battery pack. Other types of power sources, such as an external power source (e.g., an electricity outlet), photovoltaic device, or power cell, may be used. The power source 1008 may further include power circuitry for delivering power from the power source 1008 itself, and/or an external power source, to the various parts of the UE 1000 via input circuitry or an interface such as an electrical power cable. Delivering power may be, for example, for charging of the power source 1008. Power circuitry may perform any formatting, converting, or other modification to the power from the power source 1008 to make the power suitable for the respective components of the UE 1000 to which power is supplied.

The memory 1010 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1010 includes one or more application programs 1014, such as an operating system, web browser application, a widget, gadget engine, or other application, and corresponding data 1016. The memory 1010 may store, for use by the UE 1000, any of a variety of various operating systems or combinations of operating systems.

The memory 1010 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1010 may allow the UE 1000 to access instructions, application programs and the like, stored on transitory or non-transitory memory media, to off-load data, or to upload data. An article of manufacture, such as one utilizing a communication system may be tangibly embodied as or in the memory 1010, which may be or comprise a device-readable storage medium.

The processing circuitry 1002 may be configured to communicate with an access network or other network using the communication interface 1012. The communication interface 1012 may comprise one or more communication subsystems and may include or be communicatively coupled to an antenna 1022. The communication interface 1012 may include one or more transceivers used to communicate, such as by communicating with one or more remote transceivers of another device capable of wireless communication (e.g., another UE or a network node in an access network). Each transceiver may include a transmitter 1018 and/or a receiver 1020 appropriate to provide network communications (e.g., optical, electrical, frequency allocations, and so forth). Moreover, the transmitter 1018 and receiver 1020 may be coupled to one or more antennas (e.g., antenna 1022) and may share circuit components, software or firmware, or alternatively be implemented separately.

In the illustrated embodiment, communication functions of the communication interface 1012 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1012, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1000 shown in FIG. 10.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 11:
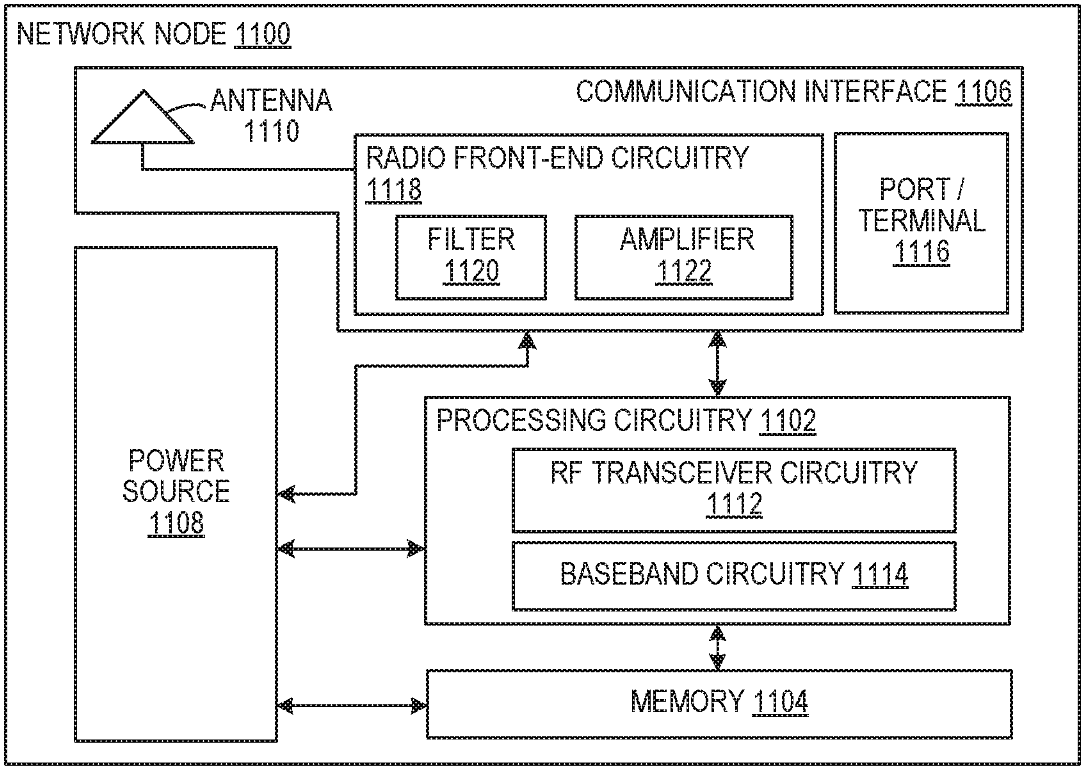
FIG. 11 illustrates a network node according to some embodiments.

FIG. 11 shows a network node 1100 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1100 includes a processing circuitry 1102, a memory 1104, a communication interface 1106, and a power source 1108. The network node 1100 may be composed of multiple physically separate components (e.g., a NodeB component and a RNC component, or a BTS component and a BSC component, etc.), which may each have their own respective components. In certain scenarios in which the network node 1100 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1100 may be configured to support multiple radio access technologies (RATs). In such embodiments, some components may be duplicated (e.g., separate memory 1104 for different RATs) and some components may be reused (e.g., a same antenna 1110 may be shared by different RATs). The network node 1100 may also include multiple sets of the various illustrated components for different wireless technologies integrated into network node 1100, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1100.

The processing circuitry 1102 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1100 components, such as the memory 1104, to provide network node 1100 functionality.

In some embodiments, the processing circuitry 1102 includes a system on a chip (SOC). In some embodiments, the processing circuitry 1102 includes one or more of radio frequency (RF) transceiver circuitry 1112 and baseband processing circuitry 1114. In some embodiments, the radio frequency (RF) transceiver circuitry 1112 and the baseband processing circuitry 1114 may be on separate chips (or sets of chips), boards, or units, such as radio units and digital units. In alternative embodiments, part or all of RF transceiver circuitry 1112 and baseband processing circuitry 1114 may be on the same chip or set of chips, boards, or units.

The memory 1104 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1102. The memory 1104 may store any suitable instructions, data, or information, including a computer program, software, an application including one or more of logic, rules, code, tables, and/or other instructions capable of being executed by the processing circuitry 1102 and utilized by the network node 1100. The memory 1104 may be used to store any calculations made by the processing circuitry 1102 and/or any data received via the communication interface 1106. In some embodiments, the processing circuitry 1102 and memory 1104 is integrated.

The communication interface 1106 is used in wired or wireless communication of signaling and/or data between a network node, access network, and/or UE. As illustrated, the communication interface 1106 comprises port(s)/terminal(s) 1116 to send and receive data, for example to and from a network over a wired connection. The communication interface 1106 also includes radio front-end circuitry 1118 that may be coupled to, or in certain embodiments a part of, the antenna 1110. Radio front-end circuitry 1118 comprises filters 1120 and amplifiers 1122. The radio front-end circuitry 1118 may be connected to an antenna 1110 and processing circuitry 1102. The radio front-end circuitry may be configured to condition signals communicated between antenna 1110 and processing circuitry 1102. The radio front-end circuitry 1118 may receive digital data that is to be sent out to other network nodes or UEs via a wireless connection. The radio front-end circuitry 1118 may convert the digital data into a radio signal having the appropriate channel and bandwidth parameters using a combination of filters 1120 and/or amplifiers 1122. The radio signal may then be transmitted via the antenna 1110. Similarly, when receiving data, the antenna 1110 may collect radio signals which are then converted into digital data by the radio front-end circuitry 1118. The digital data may be passed to the processing circuitry 1102. In other embodiments, the communication interface may comprise different components and/or different combinations of components.

In certain alternative embodiments, the network node 1100 does not include separate radio front-end circuitry 1118, instead, the processing circuitry 1102 includes radio front-end circuitry and is connected to the antenna 1110. Similarly, in some embodiments, all or some of the RF transceiver circuitry 1112 is part of the communication interface 1106. In still other embodiments, the communication interface 1106 includes one or more ports or terminals 1116, the radio front-end circuitry 1118, and the RF transceiver circuitry 1112, as part of a radio unit (not shown), and the communication interface 1106 communicates with the baseband processing circuitry 1114, which is part of a digital unit (not shown).

The antenna 1110 may include one or more antennas, or antenna arrays, configured to send and/or receive wireless signals. The antenna 1110 may be coupled to the radio front-end circuitry 1118 and may be any type of antenna capable of transmitting and receiving data and/or signals wirelessly. In certain embodiments, the antenna 1110 is separate from the network node 1100 and connectable to the network node 1100 through an interface or port.

The antenna 1110, communication interface 1106, and/or the processing circuitry 1102 may be configured to perform any receiving operations and/or certain obtaining operations described herein as being performed by the network node. Any information, data and/or signals may be received from a UE, another network node and/or any other network equipment. Similarly, the antenna 1110, the communication interface 1106, and/or the processing circuitry 1102 may be configured to perform any transmitting operations described herein as being performed by the network node. Any information, data and/or signals may be transmitted to a UE, another network node and/or any other network equipment.

The power source 1108 provides power to the various components of network node 1100 in a form suitable for the respective components (e.g., at a voltage and current level needed for each respective component). The power source 1108 may further comprise, or be coupled to, power management circuitry to supply the components of the network node 1100 with power for performing the functionality described herein. For example, the network node 1100 may be connectable to an external power source (e.g., the power grid, an electricity outlet) via an input circuitry or interface such as an electrical cable, whereby the external power source supplies power to power circuitry of the power source 1108. As a further example, the power source 1108 may comprise a source of power in the form of a battery or battery pack which is connected to, or integrated in, power circuitry. The battery may provide backup power should the external power source fail.

Embodiments of the network node 1100 may include additional components beyond those shown in FIG. 11 for providing certain aspects of the network node's functionality, including any of the functionality described herein and/or any functionality necessary to support the subject matter described herein. For example, the network node 1100 may include user interface equipment to allow input of information into the network node 1100 and to allow output of information from the network node 1100. This may allow a user to perform diagnostic, maintenance, repair, and other administrative functions for the network node 1100.

Figure 12:
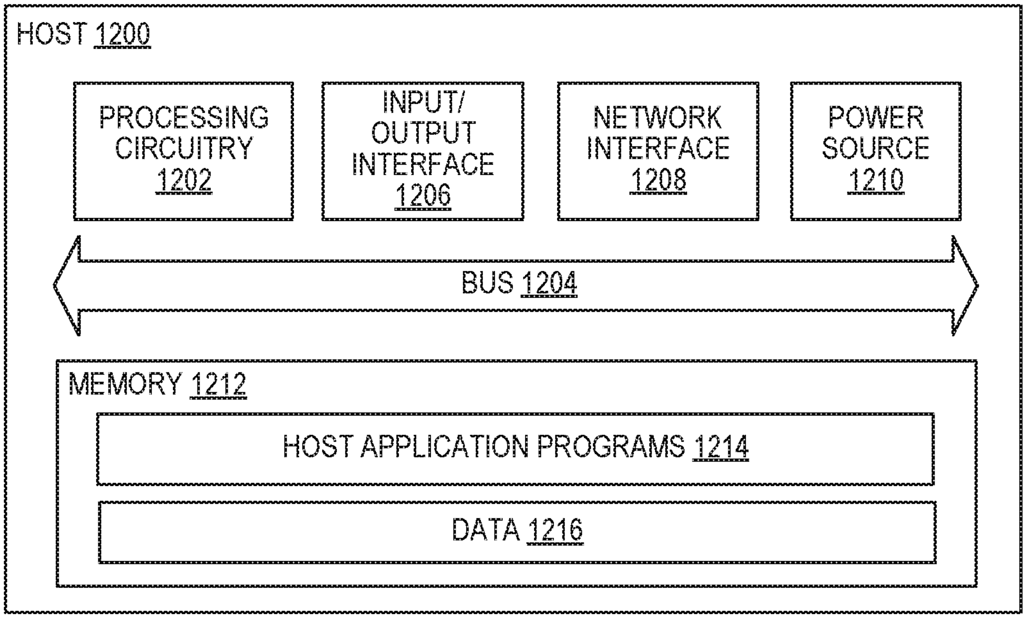
FIG. 12 illustrates a host according to some embodiments.

FIG. 12 is a block diagram of a host 1200, which may be an embodiment of the host 916 of FIG. 9, in accordance with various aspects described herein. As used herein, the host 1200 may be or comprise various combinations hardware and/or software, including a standalone server, a blade server, a cloud-implemented server, a distributed server, a virtual machine, container, or processing resources in a server farm. The host 1200 may provide one or more services to one or more UEs.

The host 1200 includes processing circuitry 1202 that is operatively coupled via a bus 1204 to an input/output interface 1206, a network interface 1208, a power source 1210, and a memory 1212. Other components may be included in other embodiments. Features of these components may be substantially similar to those described with respect to the devices of previous FIGs, such as FIGS. 10 and 11, such that the descriptions thereof are generally applicable to the corresponding components of host 1200.

The memory 1212 may include one or more computer programs including one or more host application programs 1214 and data 1216, which may include user data, e.g., data generated by a UE for the host 1200 or data generated by the host 1200 for a UE. Embodiments of the host 1200 may utilize only a subset or all of the components shown. The host application programs 1214 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1214 may also provide for user authentication and licensing checks and may periodically report health, routes, and content availability to a central node, such as a device in or on the edge of a core network. Accordingly, the host 1200 may select and/or indicate a different host for over-the-top services for a UE. The host application programs 1214 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 13:
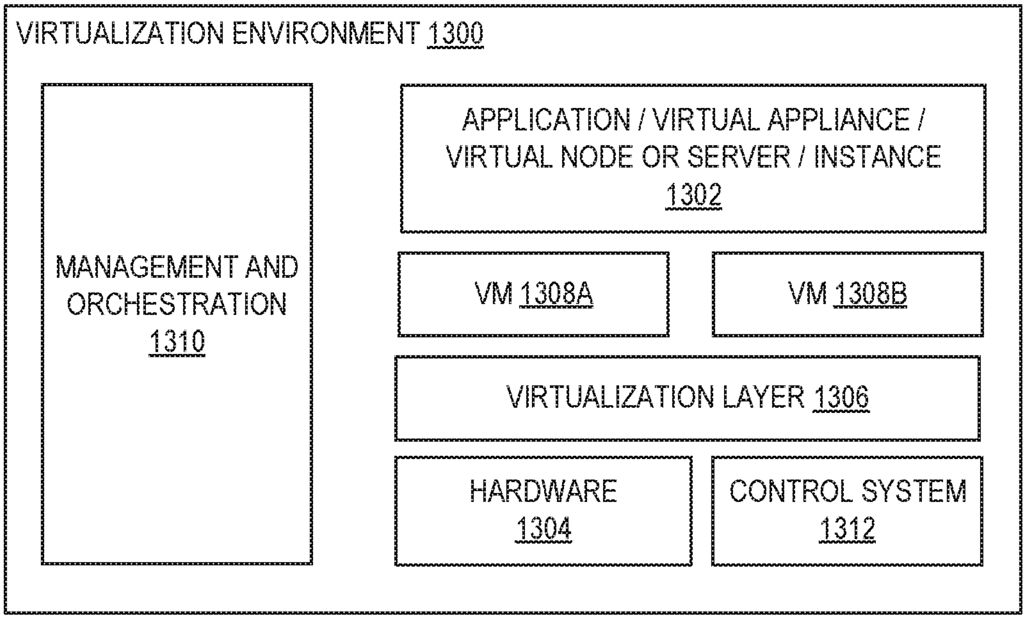
FIG. 13 illustrates a virtualization environment according to some embodiments.

FIG. 13 is a block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1300 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1302 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1304 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1306 (also referred to as hypervisors or virtual machine monitors (VMMs)), provide VMs 1308*a* and 1308*b* (one or more of which may be generally referred to as VMs 1308), and/or perform any of the functions, features and/or benefits described in relation with some embodiments described herein. The virtualization layer 1306 may present a virtual operating platform that appears like networking hardware to the VMs 1308.

The VMs 1308 comprise virtual processing, virtual memory, virtual networking or interface and virtual storage, and may be run by a corresponding virtualization layer 1306. Different embodiments of the instance of a virtual appliance 1302 may be implemented on one or more of VMs 1308, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1308 may be a software implementation of a physical machine that runs programs as if they were executing on a physical, non-virtualized machine. Each of the VMs 1308, and that part of hardware 1304 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1308 on top of the hardware 1304 and corresponds to the application 1302.

Hardware 1304 may be implemented in a standalone network node with generic or specific components. Hardware 1304 may implement some functions via virtualization. Alternatively, hardware 1304 may be part of a larger cluster of hardware (e.g. such as in a data center or CPE) where many hardware nodes work together and are managed via management and orchestration 1310, which, among others, oversees lifecycle management of applications 1302. In some embodiments, hardware 1304 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1312 which may alternatively be used for communication between hardware nodes and radio units.

Figure 14:
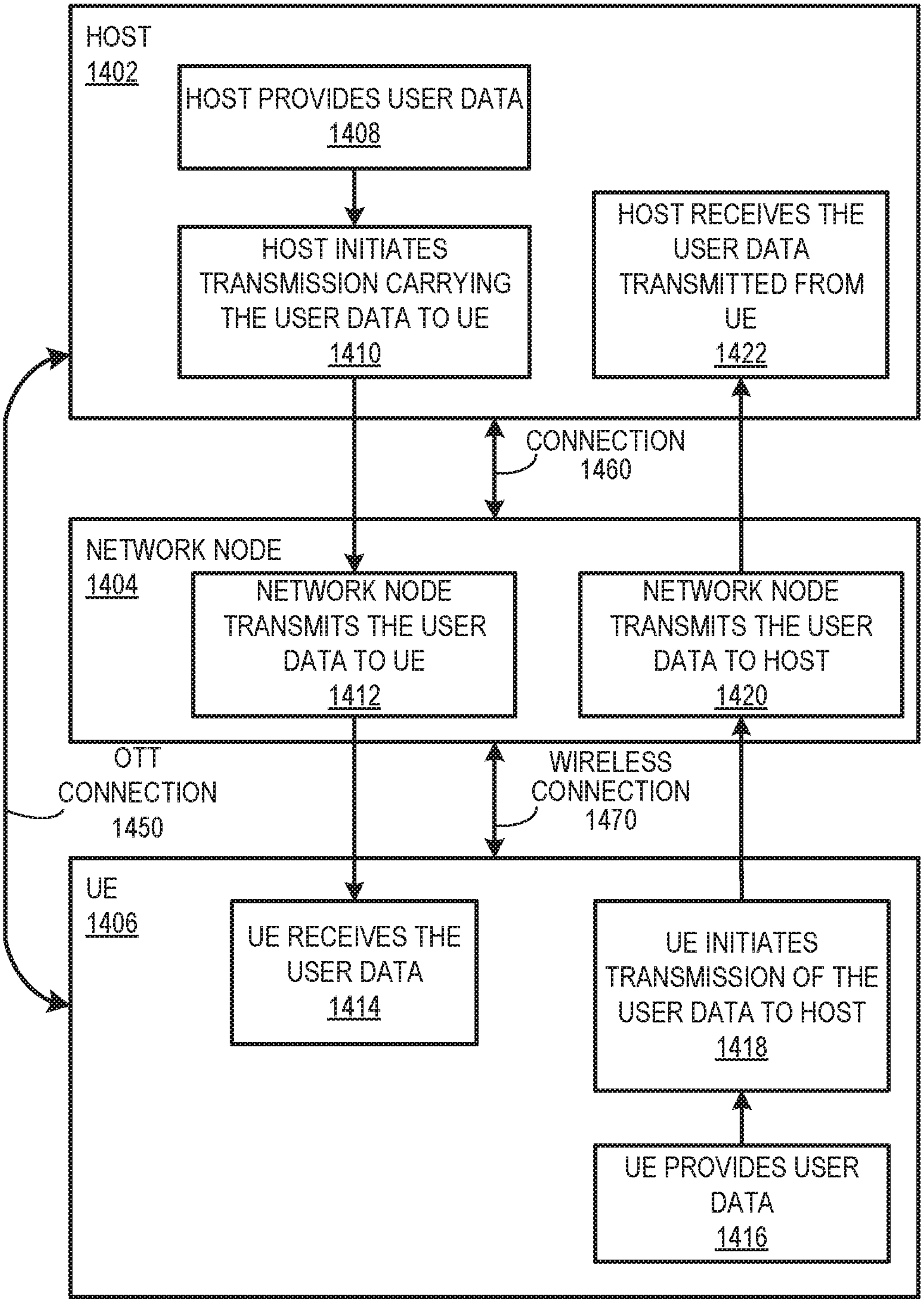
FIG. 14 shows a communication diagram of a host communicating via a network node with a UE over a partially wireless connection in accordance with some embodiments.

FIG. 14 shows a communication diagram of a host 1402 communicating via a network node 1404 with a UE 1406 over a partially wireless connection in accordance with some embodiments. Example implementations, in accordance with various embodiments, of the UE (such as a UE 912A of FIG. 9 and/or UE 1000 of FIG. 10), network node (such as network node 910A of FIG. 9 and/or network node 1100 of FIG. 11), and host (such as host 916 of FIG. 9 and/or host 1200 of FIG. 12) discussed in the preceding paragraphs will now be described with reference to FIG. 14.

Like host 1200, embodiments of host 1402 include hardware, such as a communication interface, processing circuitry, and memory. The host 1402 also includes software, which is stored in or accessible by the host 1402 and executable by the processing circuitry. The software includes a host application that may be operable to provide a service to a remote user, such as the UE 1406 connecting via an over-the-top (OTT) connection 1450 extending between the UE 1406 and host 1402. In providing the service to the remote user, a host application may provide user data which is transmitted using the OTT connection 1450.

The network node 1404 includes hardware enabling it to communicate with the host 1402 and UE 1406. The connection 1460 may be direct or pass through a core network (like core network 906 of FIG. 9) and/or one or more other intermediate networks, such as one or more public, private, or hosted networks. For example, an intermediate network may be a backbone network or the Internet.

The UE 1406 includes hardware and software, which is stored in or accessible by UE 1406 and executable by the UE's processing circuitry. The software includes a client application, such as a web browser or operator-specific "app" that may be operable to provide a service to a human or non-human user via UE 1406 with the support of the host 1402. In the host 1402, an executing host application may communicate with the executing client application via the OTT connection 1450 terminating at the UE 1406 and host 1402. In providing the service to the user, the UE's client application may receive request data from the host's host application and provide user data in response to the request data. The OTT connection 1450 may transfer both the request data and the user data. The UE's client application may interact with the user to generate the user data that it provides to the host application through the OTT connection 1450.

The OTT connection 1450 may extend via a connection 1460 between the host 1402 and the network node 1404 and via a wireless connection 1470 between the network node 1404 and the UE 1406 to provide the connection between the host 1402 and the UE 1406. The connection 1460 and wireless connection 1470, over which the OTT connection 1450 may be provided, have been drawn abstractly to illustrate the communication between the host 1402 and the UE 1406 via the network node 1404, without explicit reference to any intermediary devices and the precise routing of messages via these devices.

As an example of transmitting data via the OTT connection 1450, in step 1408, the host 1402 provides user data, which may be performed by executing a host application. In some embodiments, the user data is associated with a particular human user interacting with the UE 1406. In other embodiments, the user data is associated with a UE 1406 that shares data with the host 1402 without explicit human interaction. In step 1410, the host 1402 initiates a transmission carrying the user data towards the UE 1406. The host 1402 may initiate the transmission responsive to a request transmitted by the UE 1406. The request may be caused by human interaction with the UE 1406 or by operation of the client application executing on the UE 1406. The transmission may pass via the network node 1404, in accordance with the teachings of the embodiments described throughout this disclosure. Accordingly, in step 1412, the network node 1404 transmits to the UE 1406 the user data that was carried in the transmission that the host 1402 initiated, in accordance with the teachings of the embodiments described throughout this disclosure. In step 1414, the UE 1406 receives the user data carried in the transmission, which may be performed by a client application executed on the UE 1406 associated with the host application executed by the host 1402.

In some examples, the UE 1406 executes a client application which provides user data to the host 1402. The user data may be provided in reaction or response to the data received from the host 1402. Accordingly, in step 1416, the UE 1406 may provide user data, which may be performed by executing the client application. In providing the user data, the client application may further consider user input received from the user via an input/output interface of the UE 1406. Regardless of the specific manner in which the user data was provided, the UE 1406 initiates, in step 1418, transmission of the user data towards the host 1402 via the network node 1404. In step 1420, in accordance with the teachings of the embodiments described throughout this disclosure, the network node 1404 receives user data from the UE 1406 and initiates transmission of the received user data towards the host 1402. In step 1422, the host 1402 receives the user data carried in the transmission initiated by the UE 1406.

One or more of the various embodiments improve the performance of OTT services provided to the UE 1406 using the OTT connection 1450, in which the wireless connection 1470 forms the last segment. More precisely, the teachings of these embodiments may improve the power consumption and latency and thereby provide benefits such as improved battery life and a smoother user experience.

In an example scenario, factory status information may be collected and analyzed by the host 1402. As another example, the host 1402 may process audio and video data which may have been retrieved from a UE for use in creating maps. As another example, the host 1402 may collect and analyze real-time data to assist in controlling vehicle congestion (e.g., controlling traffic lights). As another example, the host 1402 may store surveillance video uploaded by a UE. As another example, the host 1402 may store or control access to media content such as video, audio, VR or AR which it can broadcast, multicast or unicast to UEs. As other examples, the host 1402 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1450 between the host 1402 and UE 1406, in response to variations in the measurement results. The measurement procedure and/or the network functionality for reconfiguring the OTT connection may be implemented in software and hardware of the host 1402 and/or UE 1406. In some embodiments, sensors (not shown) may be deployed in or in association with other devices through which the OTT connection 1450 passes; the sensors may participate in the measurement procedure by supplying values of the monitored quantities exemplified above, or supplying values of other physical quantities from which software may compute or estimate the monitored quantities. The reconfiguring of the OTT connection 1450 may include message format, retransmission settings, preferred routing etc.; the reconfiguring need not directly alter the operation of the network node 1404. Such procedures and functionalities may be known and practiced in the art. In certain embodiments, measurements may involve proprietary UE signaling that facilitates measurements of throughput, propagation times, latency and the like, by the host 1402. The measurements may be implemented in that software causes messages to be transmitted, in particular empty or 'dummy' messages, using the OTT connection 1450 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Figure 15:
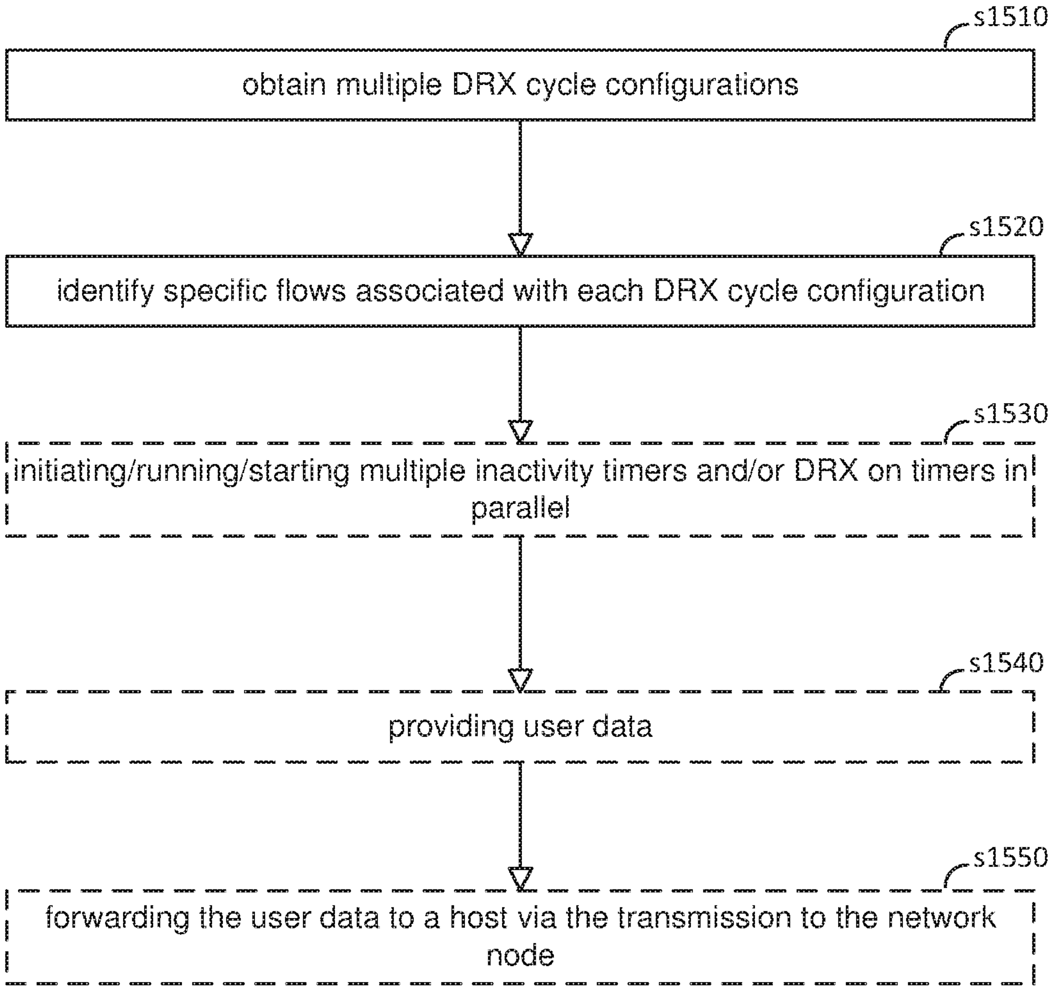
FIG. 15 is a flowchart illustrating a process according to some embodiments.

FIG. 15 depicts a process 1500 in accordance with particular embodiments. The process may begin at step s1510.

Step s1510 comprises the UE obtaining multiple DRX cycle configurations. The DRX cycle configurations could be obtained from a network node or they may be preconfigured on the UE (e.g., specified by a standard). The obtained DRX cycle configurations may be stored and/or combined. For example, some parameters from one DRX cycle configuration may be combined with other parameters from another DRX cycle configuration. In some embodiments, step s1510 may comprise obtaining a legacy or default DRX configuration that is not associated with a specific flow (e.g., a specific logical channel identified by a logical channel identifier (LCID), a specific DRB, a specific QoS flow, a specific type of traffic (e.g., video, audio, etc.)).

In some embodiments, the DRX cycle configuration may include one or more of: drx-SlotOffset(x), Long DRX cycle (x), drx-StartOffset(x), drx-onDurationTimer(x), and drx-InactivityTimer(x). In some scenarios a single general drx-InactivityTimer may be obtained which is to be applied to any DRX configuration which is not explicitly configured with a specific value. In some embodiments, a default DRX configuration may be obtained. In some scenarios, additional DRX configurations may be obtained in a way that only new/unique parameters different from the default parameters are obtained.

At step s 1520 the UE identifies specific flows associated with each DRX cycle configuration. That is, for each DRX cycle configuration, the UE identifies a set of one or more flows associated with the DRX cycle configuration. This may comprise mapping or otherwise linking or associating specific DRX configurations with the corresponding specific flow with which they are to be applied. In some embodiments, the UE may prioritize certain configuration over others (e.g., a legacy DRX configuration may be prioritized over non legacy DRX configurations) when multiple timers are running (or will be running).

In some embodiments, process 1500 also includes steps s1530, s1540, and s1550.

At step s1530 the UE initiates (e.g., activates, runs, starts) multiple DRX timers in parallel (e.g., multiple inactivity timers in parallel and/or multiple DRX on timers in parallel). In some scenarios, the timers may be initiated at different times, but may be running concurrently.

At step s1540, the UE provides user data (e.g., a request for data based on user input). At step s1550 the UE forwards the user data to a host computer via a network node. User data can also flow in the opposite direction in which the NN obtains user data and then forwards the data to the UE.

In some embodiments, obtaining the multiple DRX cycle configurations comprises obtaining a first DRX cycle configuration, and obtaining the first DRX cycle configuration comprises receiving from a network node one or more of the following parameters: drx-SlotOffset, Long DRX, drx-StartOffset, drx-onDurationTimer, and drx-InactivityTimer.

In some embodiments the multiple DRX cycle configurations comprises a general drx-InactivityTimer to be applied to any DRX cycle configuration which is not explicitly configured with a specific value.

In some embodiments the multiple DRX cycle configurations comprises a default DRX cycle configuration.

In some embodiments the default DRX cycle configuration consists of a first set of DRX parameters, the multiple DRX cycle configurations further comprises a non-default DRX cycle configuration consisting of a second set of DRX parameters, and none of the DRX parameters included in the second set of DRX parameters are included in the first set of DRX parameters.

In some embodiments the UE initiates multiple DRX timers in parallel (e.g., multiple inactivity timers in parallel and/or multiple DRX on timers in parallel).

In some embodiments the UE checks whether a current system frame number, SFN, and current subframe match one of the multiple DRX cycle configurations. That is, for example, in one embodiment, the UE determines if the current SFN and subframe match a DRX cycle configuration by determining whether: [(SFN×10)+SUBFN] modulo (drx-LongCycle)=drx-StartOffset, where drx-LongCycle and drx-StartOffset are parameters of the DRX cycle configuration and SUBFN is the subframe number of the current subframe. After identifying a match, initiates a timer associated with the DRX cycle configuration that matches the current SFN and subframe.

In some other embodiments, after identifying a match, the UE initiates a single timer, wherein the single timer is configured based on the DRX cycle configuration that matches the current SFN and subframe.

In some embodiments the UE obtains an indication of a new transmission; determines whether a DRX on timer or an inactivity timer associated with the new transmission is running; and initiates the inactivity timer if the DRX on timer or the inactivity timer was running.

In some embodiments the set of one or more flows comprises a logical channel identified by a logical channel identifier, LCID, a data radio bearer, DRB, and/or a traffic flow.

Figure 16:
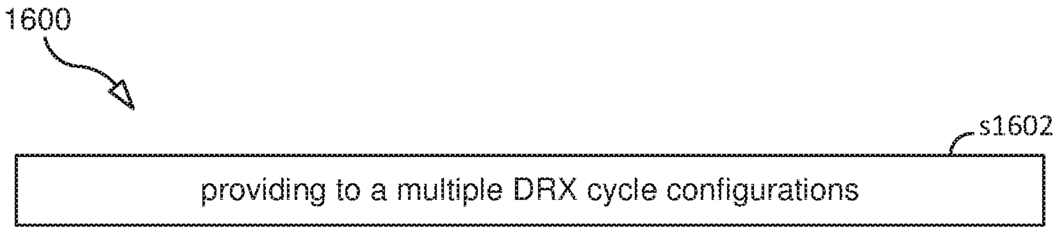
FIG. 16 is a flowchart illustrating a process according to some embodiments.

FIG. 16 depicts a process 1600 in accordance with particular embodiments. The process may begin at step s1602. Step s1602 comprises a network node (e.g., any one of network nodes 910A, 910B, 1100) providing to a UE (e.g., UE 912A, UE 912B, UE 1000), multiple DRX cycle configurations.

In some embodiments the process also includes the network node providing to the UE a legacy DRX cycle configuration that is not associated with any specific flow.

In some embodiments providing the multiple DRX cycle configurations to the UE comprises providing to the UE a first DRX cycle configuration, and providing to the UE the first DRX cycle configuration comprises providing to the UE one or more of the following parameters: drx-SlotOffset, Long DRX, drx-StartOffset, drx-onDurationTimer, and drx-InactivityTimer.

In some embodiments the multiple DRX cycle configurations comprises a general drx-InactivityTimer to be applied to any DRX cycle configuration which is not explicitly configured with a specific value.

In some embodiments the multiple DRX cycle configurations comprises a default DRX cycle configuration. In some embodiments the default DRX cycle configuration consists of a first set of DRX parameters, and the multiple DRX cycle configurations further comprises a non-default DRX cycle configuration consisting of a second set of DRX parameters. In some embodiments none of the DRX parameters included in the second set of DRX parameters are included in the first set of DRX parameters.

EMBODIMENTS

Group A Embodiments

1. A method performed by a user equipment for supporting multiple DRX configurations, the method comprising: obtaining multiple DRX cycle configurations; and identifying one or more specific flows (e.g., LCIDs, DRBs, etc.) associated with each DRX cycle configuration.
2. The method of 1 further comprising storing and/or combining the configurations for DRX operation
3. The method of any of 1-2 further comprising obtaining a legacy DRX configuration that is not associated with a specific flow.
4. The method of 3 further comprising prioritizing legacy DRX configurations DRX over non legacy DRX configurations when multiple timers are running.
5. The method of any of 1-4 wherein obtaining at least one DRX configuration of the multiple DRX configurations comprises receiving from a network node one or more of the following parameters: drx-SlotOffset(x), Long DRX cycle(x), drx-StartOffset(x), drx-onDurationTimer(x), and drx-InactivityTimer(x).

6. The method of any of 1-5 wherein obtaining multiple DRX configurations comprises obtaining one general drx-InactivityTimer to be applied to any DRX configuration which is not explicitly configured with a specific value.
7. The method of any of 1-6 wherein obtaining multiple DRX configurations comprises obtaining at least a default DRX configuration.
8. The method of 7 further comprising obtaining at least one additional DRX configuration, wherein the additional DRX configuration comprises only those parameters that are different from default DRX configuration.
9. The method of any of 1-8 further comprising initiating (e.g., running, starting) multiple DRX timers in parallel (e.g., multiple inactivity timers in parallel and/or multiple DRX on timers in parallel).
10. The method of any of 1-9 further comprising: determining whether one of the multiple DRX configurations matches a current SFN and subframe, and, as a result of determining that one of the multiple DRX configuration matches the current SFN and subframe, starting a timer associated with the DRX configuration determined to match the current SFN and subframe. For example, in one embodiment, the multiple DRX configurations includes a first DRX cycle configuration and the UE determines whether the first DRX cycle configuration matches the SFN and subframe by determining whether: [(SFN×10)+SUBFN] modulo (drx-LongCycle)=drx-StartOffset, where drx-LongCycle and drx-StartOffset are parameters of the DRX cycle configuration and SUBFN is the subframe number of the current subframe.
11. The method of any of 1-9 further comprising: determining whether one of the multiple DRX configurations matches a current SFN and subframe, and, as a result of determining that one of the multiple DRX configuration matches the current SFN and subframe, starting or resetting a single timer, wherein the single timer is configured based on the DRX configuration determined to match the current SFN and subframe.
12. The method of any of 1-11 further comprising: obtaining an indication of a new transmission; determine whether a DRX on timer or an inactivity timer associated with the new transmission is running; starting/restarting the inactivity timer if the DRX on timer or the inactivity timer was running.
13. The method of any of the previous embodiments, further comprising: providing user data; and forwarding the user data to a host via the transmission to the network node.

Group B Embodiments

14. A method performed by a network node for supporting multiple DRX configurations, the method comprising: providing multiple DRX cycle configurations.
15. The method of 14 further comprising providing a legacy DRX configuration that is not associated with a specific flow, LCID, or DRB.
16. The method of any of 14-15 wherein proving at least one DRX configuration of the multiple DRX configurations comprises providing one or more of the following parameters: drx-SlotOffset(x), Long DRX cycle(x), drx-StartOffset(x), drx-onDurationTimer(x), and drx-InactivityTimer(x).
17. The method of any of 14-16 wherein providing multiple DRX configurations comprises providing one general drx-InactivityTimer to be applied to any DRX configuration which is not explicitly configured with a specific value.
18. The method of any of 14-17 wherein providing multiple DRX configurations comprises providing at least a default DRX configuration.
19. The method of 18 further comprising providing at least one additional DRX configuration, wherein the additional DRX configuration comprises only those parameters that are different from default DRX configuration.
20. The method of any of the previous embodiments, further comprising: obtaining user data; and forwarding the user data to a host or a user equipment.

Group C Embodiments

21. A user equipment for supporting multiple DRX configurations, comprising: processing circuitry configured to perform any of the steps of any of the Group A embodiments; and power supply circuitry configured to supply power to the processing circuitry.
22. A network node for supporting multiple DRX configurations, the network node comprising: processing circuitry configured to perform any of the steps of any of the Group B embodiments; power supply circuitry configured to supply power to the processing circuitry.
23. A user equipment (UE) for supporting multiple DRX configurations, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.
24. A host configured to operate in a communication system to provide an over-the-top (OTT) service, the host comprising: processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to receive the user data from the host.
25. The host of the previous embodiment, wherein the cellular network further includes a network node configured to communicate with the UE to transmit the user data to the UE from the host.
26. The host of the previous 2 embodiments, wherein: the processing circuitry of the host is configured to execute a host application, thereby providing the user data; and the host application is configured to interact with a client application executing on the UE, the client application being associated with the host application.

27. A method implemented by a host operating in a communication system that further includes a network node and a user equipment (UE), the method comprising: providing user data for the UE; and initiating a transmission carrying the user data to the UE via a cellular network comprising the network node, wherein the UE performs any of the operations of any of the Group A embodiments to receive the user data from the host.

28. The method of the previous embodiment, further comprising: at the host, executing a host application associated with a client application executing on the UE to receive the user data from the UE.

29. The method of the previous embodiment, further comprising: at the host, transmitting input data to the client application executing on the UE, the input data being provided by executing the host application, wherein the user data is provided by the client application in response to the input data from the host application.

30. A host configured to operate in a communication system to provide an over-the-top (OTT) service, the host comprising: processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to transmit the user data to the host.

31. The host of the previous embodiment, wherein the cellular network further includes a network node configured to communicate with the UE to transmit the user data from the UE to the host.

32. The host of the previous 2 embodiments, wherein: the processing circuitry of the host is configured to execute a host application, thereby providing the user data; and the host application is configured to interact with a client application executing on the UE, the client application being associated with the host application.

33. A method implemented by a host configured to operate in a communication system that further includes a network node and a user equipment (UE), the method comprising: at the host, receiving user data transmitted to the host via the network node by the UE, wherein the UE performs any of the steps of any of the Group A embodiments to transmit the user data to the host.

34. The method of the previous embodiment, further comprising: at the host, executing a host application associated with a client application executing on the UE to receive the user data from the UE.

35. The method of the previous embodiment, further comprising: at the host, transmitting input data to the client application executing on the UE, the input data being provided by executing the host application, wherein the user data is provided by the client application in response to the input data from the host application.

36. A host configured to operate in a communication system to provide an over-the-top (OTT) service, the host comprising: processing circuitry configured to provide user data; and a network interface configured to initiate transmission of the user data to a network node in a cellular network for transmission to a user equipment (UE), the network node having a communication interface and processing circuitry, the processing circuitry of the network node configured to perform any of the operations of any of the Group B embodiments to transmit the user data from the host to the UE.

37. The host of the previous embodiment, wherein: the processing circuitry of the host is configured to execute a host application that provides the user data; and the UE comprises processing circuitry configured to execute a client application associated with the host application to receive the transmission of user data from the host.

38. A method implemented in a host configured to operate in a communication system that further includes a network node and a user equipment (UE), the method comprising: providing user data for the UE; and initiating a transmission carrying the user data to the UE via a cellular network comprising the network node, wherein the network node performs any of the operations of any of the Group B embodiments to transmit the user data from the host to the UE.

39. The method of the previous embodiment, further comprising, at the network node, transmitting the user data provided by the host for the UE.

40. The method of any of the previous 2 embodiments, wherein the user data is provided at the host by executing a host application that interacts with a client application executing on the UE, the client application being associated with the host application.

41. A communication system configured to provide an over-the-top service, the communication system comprising: a host comprising: processing circuitry configured to provide user data for a user equipment (UE), the user data being associated with the over-the-top service; and a network interface configured to initiate transmission of the user data toward a cellular network node for transmission to the UE, the network node having a communication interface and processing circuitry, the processing circuitry of the network node configured to perform any of the operations of any of the Group B embodiments to transmit the user data from the host to the UE.

42. The communication system of the previous embodiment, further comprising: the network node; and/or the user equipment.

43. A host configured to operate in a communication system to provide an over-the-top (OTT) service, the host comprising: processing circuitry configured to initiate receipt of user data; and a network interface configured to receive the user data from a network node in a cellular network, the network node having a communication interface and processing circuitry, the processing circuitry of the network node configured to perform any of the operations of any of the Group B embodiments to receive the user data from a user equipment (UE) for the host.

44. The host of the previous 2 embodiments, wherein: the processing circuitry of the host is configured to execute a host application, thereby providing the user data; and the host application is configured to interact with a client application executing on the UE, the client application being associated with the host application.

45. The host of the any of the previous 2 embodiments, wherein the initiating receipt of the user data comprises requesting the user data.

46. A method implemented by a host configured to operate in a communication system that further includes a network node and a user equipment (UE), the method comprising: at the host, initiating receipt of user data from the UE, the user data originating from a transmission which the network node has received from the UE, wherein the network node performs any of the steps of any of the Group B embodiments to receive the user data from the UE for the host.
47. The method of the previous embodiment, further comprising at the network node, transmitting the received user data to the host.

While various embodiments are described herein, it should be understood that they have been presented by way of example only, and not limitation. Thus, the breadth and scope of this disclosure should not be limited by any of the above described exemplary embodiments. Moreover, any combination of the above-described objects in all possible variations thereof is encompassed by the disclosure unless otherwise indicated herein or otherwise clearly contradicted by context.

As used herein transmitting a message to an intended recipient encompasses transmitting the message directly to the intended recipient or transmitting the message indirectly to the intended recipient (i.e., one or more other nodes are used to relay the message from the source node to the intended recipient). Likewise, as used herein receiving a message from a sender encompasses receiving the message directly from the sender or indirectly from the sender (i.e., one or more nodes are used to relay the message from the sender to the receiving node). The term “a” as used herein means “at least one” or “one or more” unless the context indicates that “a” means “one.”

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] 3GPP, TS 38.321, V16.5.0 (2021-06), Section 5.7 Discontinuous Reception (DRX).

[2] 3GPP, TS 38.331, V16.5.0 (2021-06), Section 6.3.2 Radio resource control information elements.

[3] 3GPP, S4aV200640, “[FS_XRTraffic] Summary of XR Traffic Models for RAN1 and Open Issues”, 12 Jan. 2021.

| Abbreviation | Explanation |
| --- | --- |
| CSI | channel state information |
| CRC | Cyclic Redundancy Check |
| DCI | downlink control information |
| DCP | DCI with CRC scrambled by PS-RNTI |
| DL | downlink |
| DRB | data radio bearer |
| DRX | discontinuous reception |
| fps | frames per second |
| HARQ | hybrid automatic repeat request |
| L1-RSRP | Layer 1-reference signal received power |
| LCID | logical channel identifier |
| MAC | medium access control |
| PDCCH | physical downlink control channel |
| PDSCH | physical downlink shared channel |
| PDU | protocol data unit |
| PS-RNTI | power saving-radio network temporary identifier |
| PUCCH | physical uplink control channel |
| RRC | Radio Resource Control |
| SFN | system frame number |
| TDD | time division duplexing |
| TS | time slot |
| UE | user equipment |
| UL | uplink |
| XR | extended reality |

The invention claimed is:

1. A method performed by a user equipment (UE) for supporting multiple discontinuous reception (DRX) cycle configurations, the method comprising:
obtaining multiple DRX cycle configurations;
for each DRX cycle configuration of the multiple DRX cycle configurations, identifying a set of one or more flows associated with the DRX cycle configuration;
obtaining a legacy DRX cycle configuration, the legacy DRX cycle configuration not associated with any specific flow; and
prioritizing the legacy DRX cycle configuration over the multiple DRX cycle configurations when multiple DRX timers are running.

2. The method of claim 1, further comprising combining the multiple DRX cycle configurations for a DRX operation.

3. The method of claim 1, wherein obtaining the multiple DRX cycle configurations comprises obtaining a first DRX cycle configuration, and obtaining the first DRX cycle configuration comprises receiving from a network node one or more of the following parameters: drx-SlotOffset, Long DRX, drx-StartOffset, drx-onDurationTimer, and drx-InactivityTimer.

4. The method of claim 1, wherein the multiple DRX cycle configurations comprise a general drx-InactivityTimer to be applied to any DRX cycle configuration which is not explicitly configured with a specific value.

5. The method of claim 1, wherein
the multiple DRX cycle configurations comprise a default DRX cycle configuration,
the default DRX cycle configuration consists of a first set of one or more DRX parameters,
the multiple DRX cycle configurations further comprise a non-default DRX cycle configuration consisting of a second set of one or more DRX parameters, and
none of the DRX parameters included in the second set of DRX parameters are included in the first set of DRX parameters.

6. The method of claim 1, further comprising initiating the multiple DRX timers in parallel.

7. The method of claim 1, wherein
the multiple DRX cycle configurations include a first DRX cycle configuration, and
the method further comprises:
the UE determining whether the first DRX cycle configuration matches a current system frame number (SFN) and a current subframe; and
as a result of determining that the first DRX cycle configuration matches the current SFN and the current subframe:
i) initiating a timer associated with the first DRX cycle configuration that matches the current SFN and the current subframe, or ii) initiating a single timer, wherein the single timer is configured based on the first DRX cycle configuration that matches the current SFN and the current subframe.

8. The method of claim 7, wherein determining whether the first DRX cycle configuration matches the current SFN and the current subframe comprises determining whether:

[(SFN×10)+SUBFN] modulo (drx-LongCycle)=drx-StartOffset, where drx-LongCycle and drx-StartOffset are parameters of the first DRX cycle configuration, and SUBFN is the subframe number of the current subframe.

9. The method of claim 1, wherein the method further comprises:

obtaining an indication of a new transmission; and determining whether a DRX-on timer or an inactivity timer associated with the new transmission is running; and the method further comprises:

restarting the inactivity timer as a result of determining that the inactivity timer is running; or starting the inactivity timer as a result of determining that: i) the inactivity timer is not running and ii) the DRX-on timer is running.

10. The method of claim 1, wherein the set of one or more flows comprises a logical channel identified by a logical channel identifier, a data radio bearer, and/or a traffic flow.

11. A user equipment (UE) for supporting multiple DRX configurations, the UE comprising:

processing circuitry; and a power source configured to supply power to the processing circuitry, wherein the UE is operable to perform a method comprising:

obtaining multiple DRX cycle configurations;

for each DRX cycle configuration of the multiple DRX cycle configurations, identifying a set of one or more flows associated with the DRX cycle configuration;

obtaining a legacy DRX cycle configuration, the legacy DRX cycle configuration not associated with any specific flow; and prioritizing the legacy DRX cycle configuration over the multiple DRX cycle configurations when multiple DRX timers are running.

12. The UE of claim 11, wherein the method further comprises combining the multiple DRX cycle configurations for a DRX operation.

13. The UE of claim 11, wherein obtaining the multiple DRX cycle configurations comprises obtaining a first DRX cycle configuration, and obtaining the first DRX cycle configuration comprises receiving from a network node one or more of the following parameters: drx-SlotOffset, Long DRX, drx-StartOffset, drx-onDurationTimer, and drx-InactivityTimer.

14. The UE of claim 11, wherein the multiple DRX cycle configurations comprise a general drx-Inactivity Timer to be applied to any DRX cycle configuration which is not explicitly configured with a specific value.

15. The UE of claim 11, wherein the multiple DRX cycle configurations comprise a default DRX cycle configuration.

16. The UE of claim 15, wherein the default DRX cycle configuration consists of a first set of one or more DRX parameters, the multiple DRX cycle configurations further comprises a non-default DRX cycle configuration consisting of a second set of one or more DRX parameters, and none of the DRX parameters included in the second set of DRX parameters are included in the first set of DRX parameters.

17. A method performed by a user equipment (UE) for supporting multiple discontinuous reception (DRX) cycle configurations, the method comprising:

obtaining multiple DRX cycle configurations;

for each DRX cycle configuration of the multiple DRX cycle configurations, identifying a set of one or more flows associated with the DRX cycle configuration;

determining whether a first DRX cycle configuration of the multiple DRX cycle configurations matches a current system frame number (SFN) and a current subframe; and as a result of determining that the first DRX cycle configuration matches the current SFN and the current subframe:

i) initiating a timer associated with the first DRX cycle configuration that matches the current SFN and the current subframe, or ii) initiating a single timer, wherein the single timer is configured based on the DRX cycle configuration that matches the current SFN and the current subframe.

* * * * *